United States Patent [19]
Kurita et al.

[11] Patent Number: 4,836,722
[45] Date of Patent: Jun. 6, 1989

[54] METHOD AND APPARATUS FOR REMOVING FLASH OF POLYMERIC MOLDED PRODUCTS

[75] Inventors: Toshinori Kurita; Masaaki Enomoto; Hidetoshi Nagamatsu, all of Aichi, Japan

[73] Assignee: Toyoda Gosei Co., Ltd., Nishikasugai, Japan

[21] Appl. No.: 894,896

[22] Filed: Aug. 8, 1986

[30] Foreign Application Priority Data

| Aug. 10, 1985 | [JP] | Japan | 60-123329[U] |
| Aug. 29, 1985 | [JP] | Japan | 60-191610 |
| Aug. 30, 1985 | [JP] | Japan | 60-192563 |
| Sep. 5, 1985 | [JP] | Japan | 60-196447 |
| Sep. 5, 1985 | [JP] | Japan | 60-196446 |
| Sep. 9, 1985 | [JP] | Japan | 60-199167 |
| Jun. 27, 1986 | [JP] | Japan | 61-152296 |

[51] Int. Cl.$^4$ ............................ B23C 3/00; B23C 5/04
[52] U.S. Cl. ...................................... 409/132; 407/54; 409/100; 409/111; 409/112; 409/179; 409/180
[58] Field of Search ............ 409/131, 132, 138, 137, 409/139, 140, 84, 126, 127, 128, 129, 175, 178, 179, 180, 181, 85, 86, 87, 88, 89–100, 110, 111, 112, 291; 407/53, 54

[56] References Cited

U.S. PATENT DOCUMENTS

| 476,817 | 6/1892 | Pratt | 407/54 |
| 4,027,575 | 6/1977 | White | 409/138 |
| 4,221,514 | 9/1980 | Pavlovsky | 409/291 |
| 4,519,167 | 5/1985 | Halberschmidt et al. | 409/92 |

FOREIGN PATENT DOCUMENTS

| 178628 | 4/1986 | European Pat. Off. | 409/138 |
| 2848203 | 5/1979 | Fed. Rep. of Germany | 409/86 |
| 28443 | 2/1983 | Japan | 409/175 |
| 1404492 | 8/1975 | United Kingdom | 407/53 |

*Primary Examiner*—Z. R. Bilinsky
*Attorney, Agent, or Firm*—Cushman, Darby & Cushman

[57] ABSTRACT

A flash removing method whereby flash is cut off by a reamer which is freely movable while being in contact with polymeric molded products within a predetermined range of pressing force. The reamer is provided with blades having normal clearance angles of substantially zero degree and the flanks of the blades follow the flash-forming region. The reamer is controlled in radial position according to the shape of the polymeric molded product, so that the reamer always receives a constant radial load from the product to leave even traces after the flash removal. A solidified gate is cut off before the flash removal. A flash removing apparatus for performing the method.

14 Claims, 20 Drawing Sheets

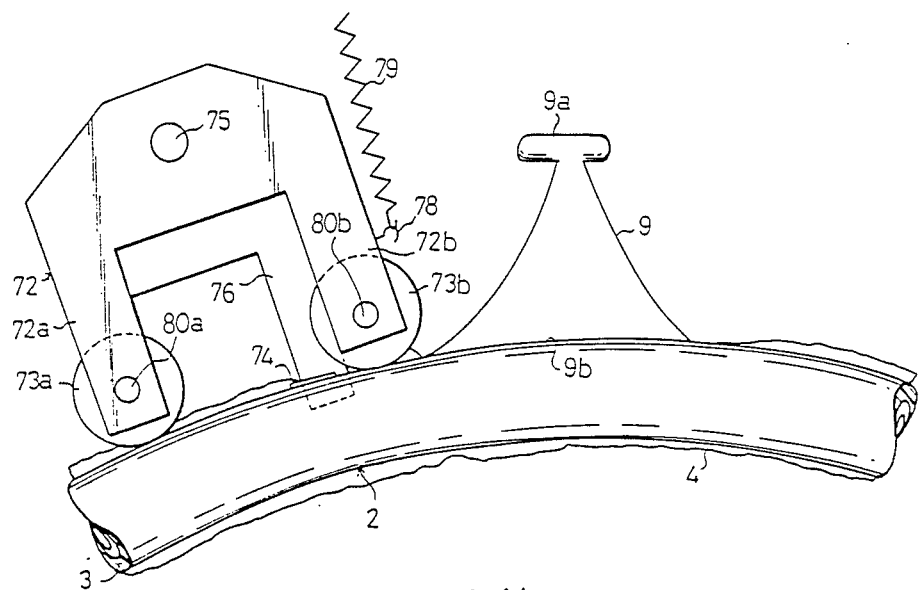
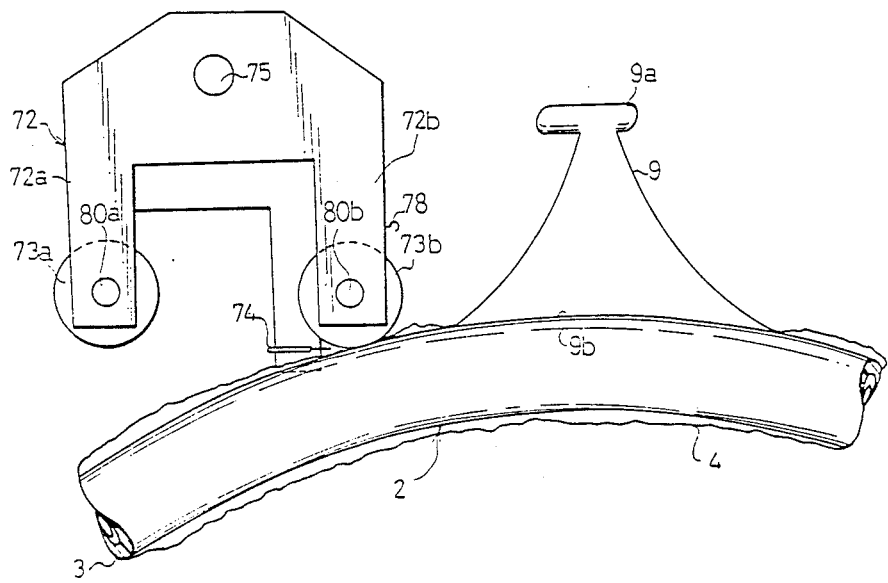

METHOD AND APPARATUS FOR REMOVING FLASH OF POLYMERIC MOLDED PRODUCTS

BACKGROUND OF THE INVENTION

1. Field of the Invention

This invention relates to a method and an apparatus for removing flash of polymeric molded products.

2. Description of the Related Art

In the art of injecting synthetic polymers into dies to make molded products, the molded products taken away from the dies, in general, unfavorably have flash. Since the dies are assembled to give the die matching surface, the polymers may enter into the die matching surface and solidified there to make flash.

Furthermore, there are specific methods even positively allowing the flash to be produced. For example, in the case of molding foam polyurethane products, the gap at the die matching surface may be slightly enlarged to allow air in the dies to easily escape through the gap.

Referring to FIGS. 27 and 28 showing the related art, a mandrel 202 is located in insert dies (not shown); foam polyurethane is injected into the dies; the solidified polymeric molded product is taken away from the dies to obtain a steering wheel 205 (called simply "ring" hereafter) the mandrel 202 of which is covered with armoring material 201.

During the molding, burr 203 is produced at the inner and outer peripheries of the ring 205. Furthermore, since the molten polymer is injected into the dies generally through a polymer injection path called gate, the ring 205 is provided with a solidified polymeric substance 204 set in the injection path (called solidified gate hereafter) as the dies are cooled.

Since the burr 203 is useless for the ring 205, it is usually cut and removed from the ring 205. Of course, the solidified gate 204 is also removed.

Heretofore, the burr removing operation for the burr 203 has been carried out by a manual work using a cutter.

However, the burr removing operation by the manual work has the following problems: the removal leaves uneven trace; a part of product other than the burr would often be removed to make inferior goods; and the work efficiency is poor.

Under the circumstances, a motor-driving flash removing operation may be considered in which a cutter is installed on the rotary shaft of a motor; the motor is operated by a robot; and the cutter is applied to the flash of the polymeric molded product to remove it.

The direct performance of this motor-driving method can cut and remove the flash, but it suffers from the following problems: excessive removal would occur to remove a part of product other than the burr; or insufficient removal would occur to leave a part of the flash, lowering the commercial value of the products.

Furthermore, soft polymeric molded products and foam products such as polyurethane and rubber, in practice, have at their outer surfaces undulation within tolerance because of their molding distortion. In this case, the above problems would become more remarkable unless the cutter is moved to follow the undulation.

Accordingly, the burr removing operation by the mechanical means having the function of simple cutter rotation has not been in practical use.

On the other hand, using the usual reamer would be considered for the flash removing operation.

The reamer used for this flash removing operation is, as shown in FIG. 29, the very same reamer 206 for metallic materials. Using this reamer 206, its blades 207 often invade a part of product unless careful operation is performed, to make inferior goods. Thus, this operation requires high skill and great care.

Furthermore, the reamer 206 defines grooves 208 of V-shape cross sections between the blades 207; the bottom of the groove 208 is provided with a crack-preventing groove 209 of circular cross section. The removed flash is easy to be collected in the grooves 209, so that some cases require another operation of taking away the collected flash from the grooves 209.

In addition to the above problems, the flash removing operation by the mechanical means would suffer from another problem that works to be processed such as polymeric molded products have to be supported and fixed by appropriate different jigs for different works.

Namely, the works tend to have much variety in shapes because of the use of the small-amount multi-product production system in recent years, so that it shows a tendency to increase that the works of the same kind have different shapes in detailed structures among them. Therefore, in processing the works, jigs have to be replaced by other ones for different works having different detailed structures.

Such replacement of jigs would cause replacement of associated devices, for example cutting tools, requiring much labor. Using wrong cutting tools, inferior goods would be produced.

SUMMARY OF THE INVENTION

An object of the present invention is to provide a method and an apparatus for removing flash of polymeric molded products permitting a cutter to be freely movable and follow undulation, on which the flash is attached, of the products even if the undulation appears on the flash-forming region, so that no excessive flash removal is expected to avoid removal of the product itself, no insufficient flash removal is expected to avoid leaving the flash, and there is no danger in handling the cutter as compared with the manual work.

Another object of the present invention is to provide a method and an apparatus for removing flash of polymeric molded products permitting the flash removing process and its previous and following processes, for example a fixing process for the products and a cutting process for the solidified gates, to be synchronized and automated.

A further object of the present invention is to provide a method and an apparatus for removing flash of polymeric molded products permitting the work efficiency of the total apparatus using a receiving jig for fixing the products to be increased, and permitting malfunction to be avoided.

A still further object of the present invention is to provide a method and an apparatus for removing flash of polymeric molded products permitting beautiful traces to be left after the removal of the solidified gate, and thus permitting high quality products to be obtained.

A still further object of the present invention is to provide a method and an apparatus for removing flash of polymeric molded products permitting the cutter not to cut into the products by mistake.

A still further object of the present invention is to provide a method and an apparatus for removing flash of polymeric molded products permitting the cutting of the solidified gate to take a short time, and the work efficiency thereof to be increased as compared with the related art.

A still further object of the present invention is to provide a method and an apparatus for removing flash of polymeric molded products permitting the cutting of the solidified gate to become easy and reliable, and no residual flash to appear.

A still further object of the present invention is to provide a method and an apparatus for removing flash of polymeric molded products permitting the removed flash not to be collected in grooves of the cutter.

To accomplish the above objects, the present invention comprises the steps of: rotating a cutting reamer of flash removing means; cutting off the flash of the polymeric molded product by the cutting reamer, wherein said reamer is movable while being in contact with said polymeric molded product within a predetermined range of pressing force toward said product in the step (b).

Other objects of the present invention will become apparent from the below description of the preferred embodiments and appended claims. Many advantages not mentioned in the specification will be noted to those skilled in the art as the invention is in practical use.

BRIEF DESCRIPTION OF THE DRAWINGS

FIG. 13 is an explanatory view showing the state that the solidified gate cutting means is in completely contact with the steering wheel;
FIG. 14 is an explanatory view showing the state that the solidified gate cutting means is in contact with the steering wheel in another manner.

DESCRIPTION OF THE PREFERRED EMBODIMENTS

There will now be described the first embodiment of the present invention by referring to FIGS. 1 to 8.

Figure 1:
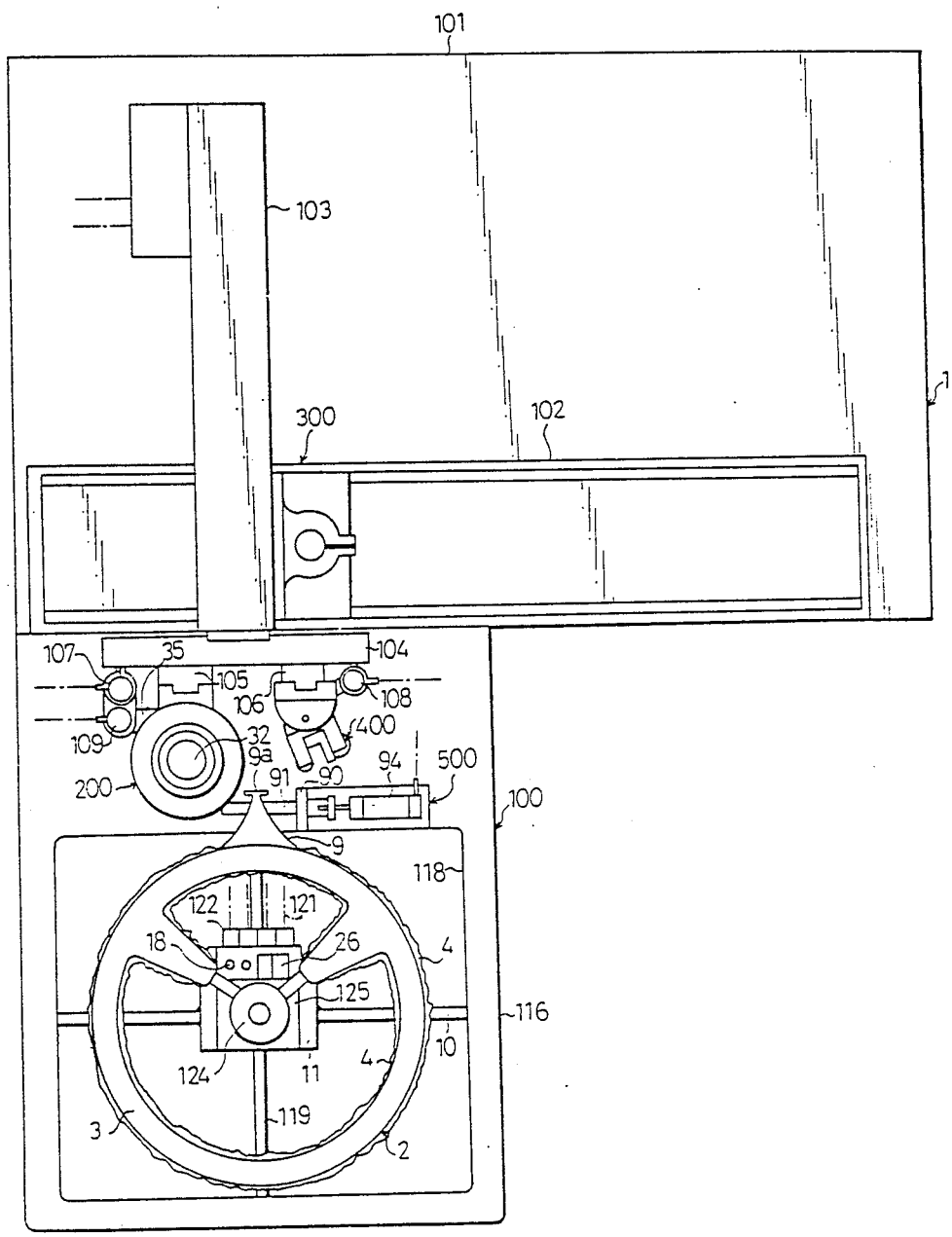
FIG. 1 is a plane view of the first embodiment.
Figure 2:
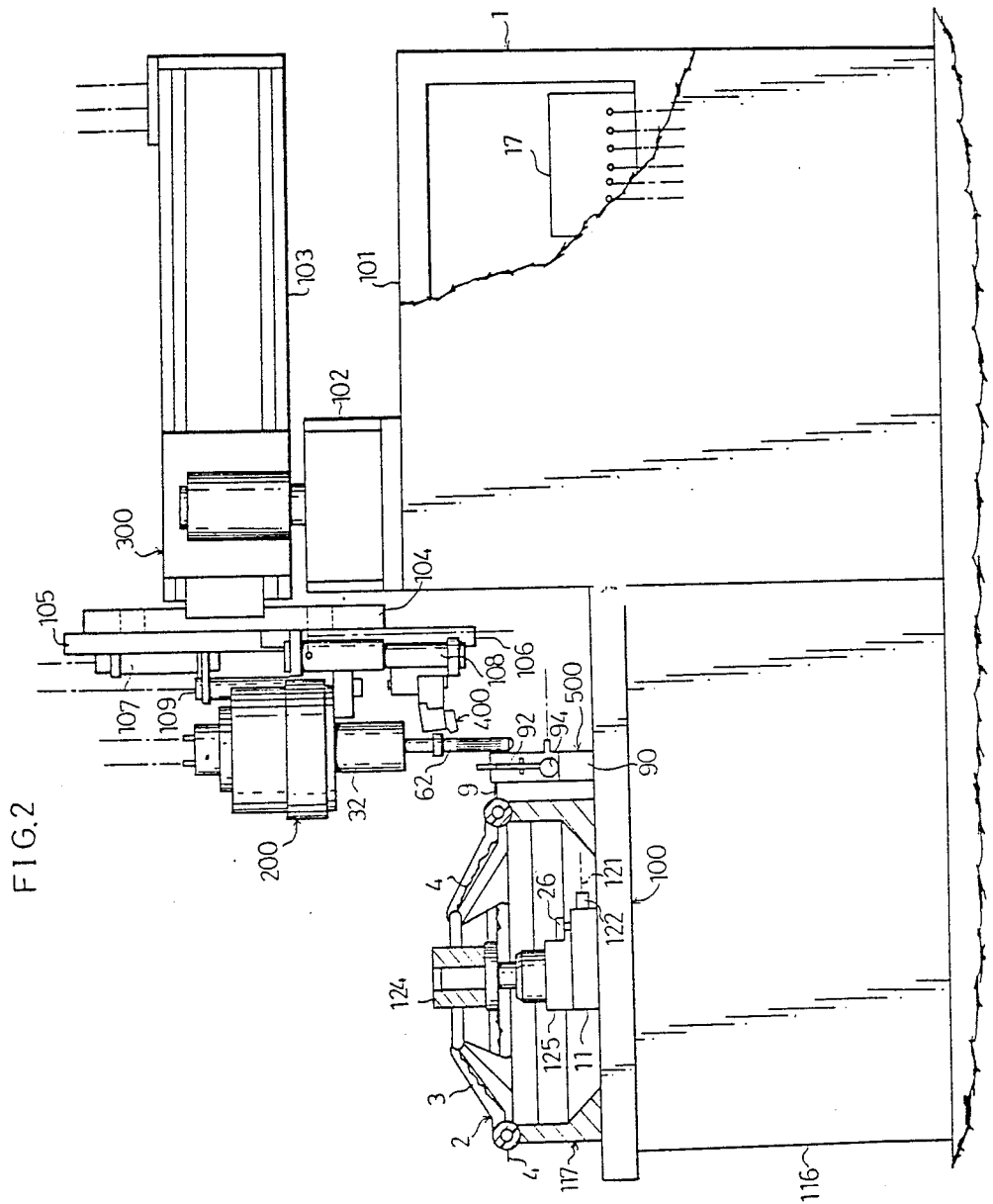
FIG. 2 is a side view of the first embodiment.

Referring to FIGS. 1 and 2, this embodiment is applied to the armoring material 3, polymeric molded product, of the ring 2 (sterring wheel) of automobiles, cutting and removing flash 4 from the armoring material 3.

The apparatus according to this embodiment is composed of fixing means 100 for fixing the ring 2, flash removing means 200 for removing the flash 4, and shifting means 300 for shifting the flash removing means 200 toward the fixing means 100 to bring the flash removing means 200 into contact with the ring 2.

Fixing Means 100

As shown in FIGS. 1 and 2, the fixing means 100 is essentially composed of a base 116 of rectangular cross section, and a ring holding member 117 and a boss fixing member 125 both mounted on the base 116 to hold the ring 2. The base 116 is provided in its inside with a receiving chamber 118 defining a space in which the burr 4 cut and removed from the armoring material 3 falls and is collected.

Supporting rods 10 extend over the receiving chamber 118 in a cruciform manner to support the ring holding member 117 and the boss fixing member 125. A fastening plate 11 of rectangular shape is welded to the intersecting region of the supporting rods 10 so that the boss fixing member 125 is mounted on the fastening plate 11.

To the fastening plate 11 are connected a plurality of terminals 122 for signal cables 121. The fastening plate 11 is provided with switches 18 corresponding in number to the terminals 122.

On the top surface of the fastening plate 11 is mounted the boss fixing member 125 over which the boss 124 of the ring 2 is fitted and held.

The boss fixing member 125 is provided at its one side with a claw portion 26, so that as the boss fixing member 125 is put on and fixed to the fastening plate 11, some of the switches 18 provided on the fastening plate 11 are automatically turned on.

In addition, the boss fixing member 125 is so formed that where the boss 124 of the ring 2 is different in shape and size from the associated part of the boss fixing member 125, the former can not be fitted over the latter.

Accordingly, there are prepared plural kinds of the boss fixing members 125 corresponding to different bosses 124. The switches 123 serve for judging what kind of the ring 2 is fixed to the fixing means 100 and for transferring this result to the below-mentioned control means through the signal cables 121.

The ring holding member 117 is mounted on the supporting rods 10, at the radial outside of the boss fixing member 125 in a ring-like manner. After the boss 124 of the ring 2 is fitted over the boss fixing member 125, the outer wheel region of the ring 2 is fixed to the ring holding member 117.

Flash Removing Means 200

There will next be described the flash removing means 200 by referring to FIGS. 3 to 8.

Figure 3:
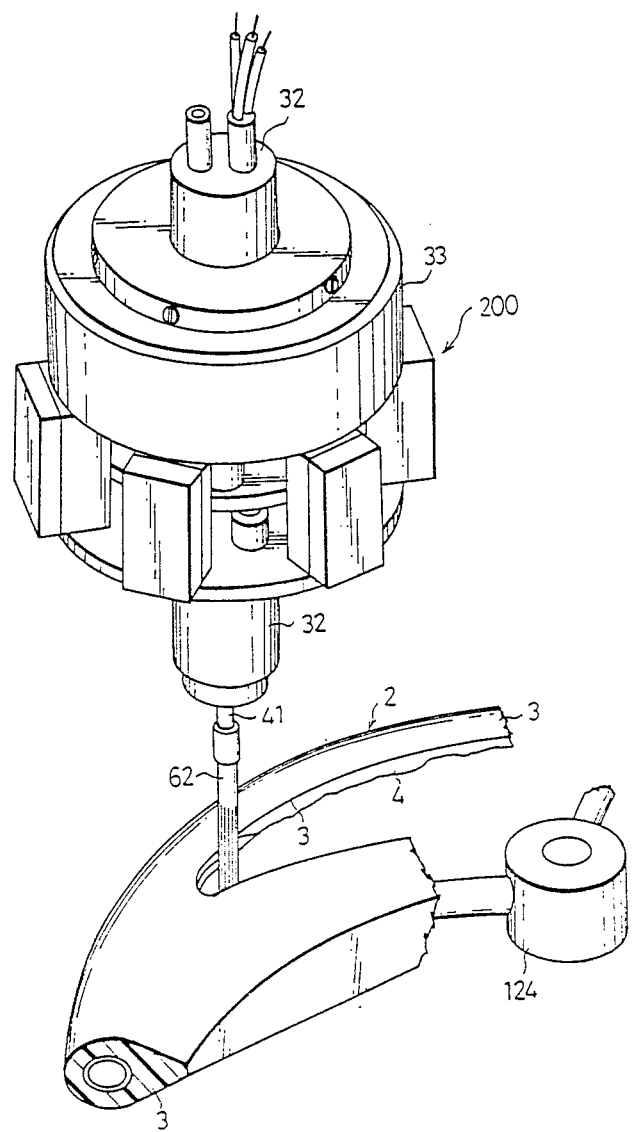
FIG. 3 is a perspective view of flash removing means.

As shown in FIG. 3, the flash removing means 200 is composed of a vertical type motor 32, a rotary cutter 62 connected to the end of the rotary shaft 41 of the motor 32, a supporting member 33 for surrounding and supporting the motor 32, and other members. The rotary cutter 62 is a reamer having a clearance angle of zero degree.

Figure 4:
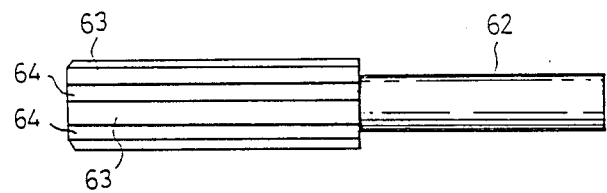
FIG. 4 is a side view of a cutter.
Figure 5:
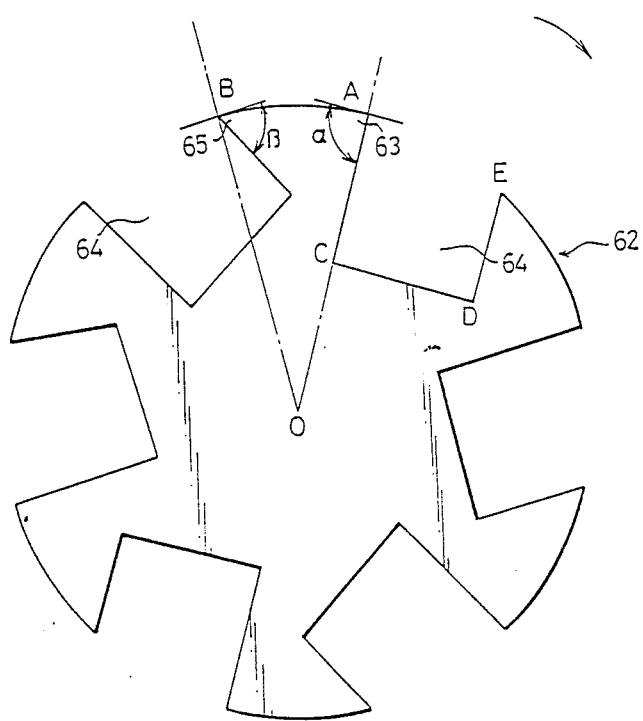
FIG. 5 is an enlarged transverse sectional view of the cutter.

As shown in FIGS. 4 and 5, the burring reamer 62 is 110 mm in total length, 80 mm in cutter length, and 12 mm in cutter diameter, and is formed at its outer periphery with six blades 63. Each blade 63 has a flank extending on a circle having the same center O as the reamer 62. Namely, the arc AB of the flank of the blade 63 extends on a circle having a radius AO and the center O, that is the normal clearance angle in zero degree.

Where, the normal clearance angle is defined as an intersecting angle between a tangential line of the traced circle traced by the tip end of the blade 63 and a flank line of the blade 63. Therefore, the normal clearance angle of zero degree means that the overall region of the flank of the blade 63 is on the same distance from the center axis of the burring reamer 62, i.e. on the circle having the center O in this embodiment.

The cutting angle (angle CAB) α of the blade 63 is 90 degrees. Between the blades 63 are defined grooves 64 of rectangular cross sections which are 3 mm in opening width (AE) and 3 mm in depth (AC). In addition, the second type blade 65 having a cutting angle β may be provided on the opposite side of the blade 63.

Thus, a suitable blade type may be selected from the two types depending on the rotational speed of the reamer 62.

Where, the cutting angle is defined as an angle occupied by the tip end of the blade 63 or 65, i.e. α and β in this embodiment.

The bottom of the grooves 64 has two facing angles, angles ACD and EDC, of 90 degrees.

When the reamer 62 is brought into contact with the flash-forming region of the ring 2 and rotated (see FIG. 3), only the flash 4 is cut and removed. Where the rotational speed is high the rake angle of the reamer 62 is made obtuse, whereas where the rotational speed is low the rake angle is made acute.

The supporting member 33 has a certain shape and size so as to support the motor 32, and is composed of a combination of the below mentioned members in this embodiment.

Figure 6:
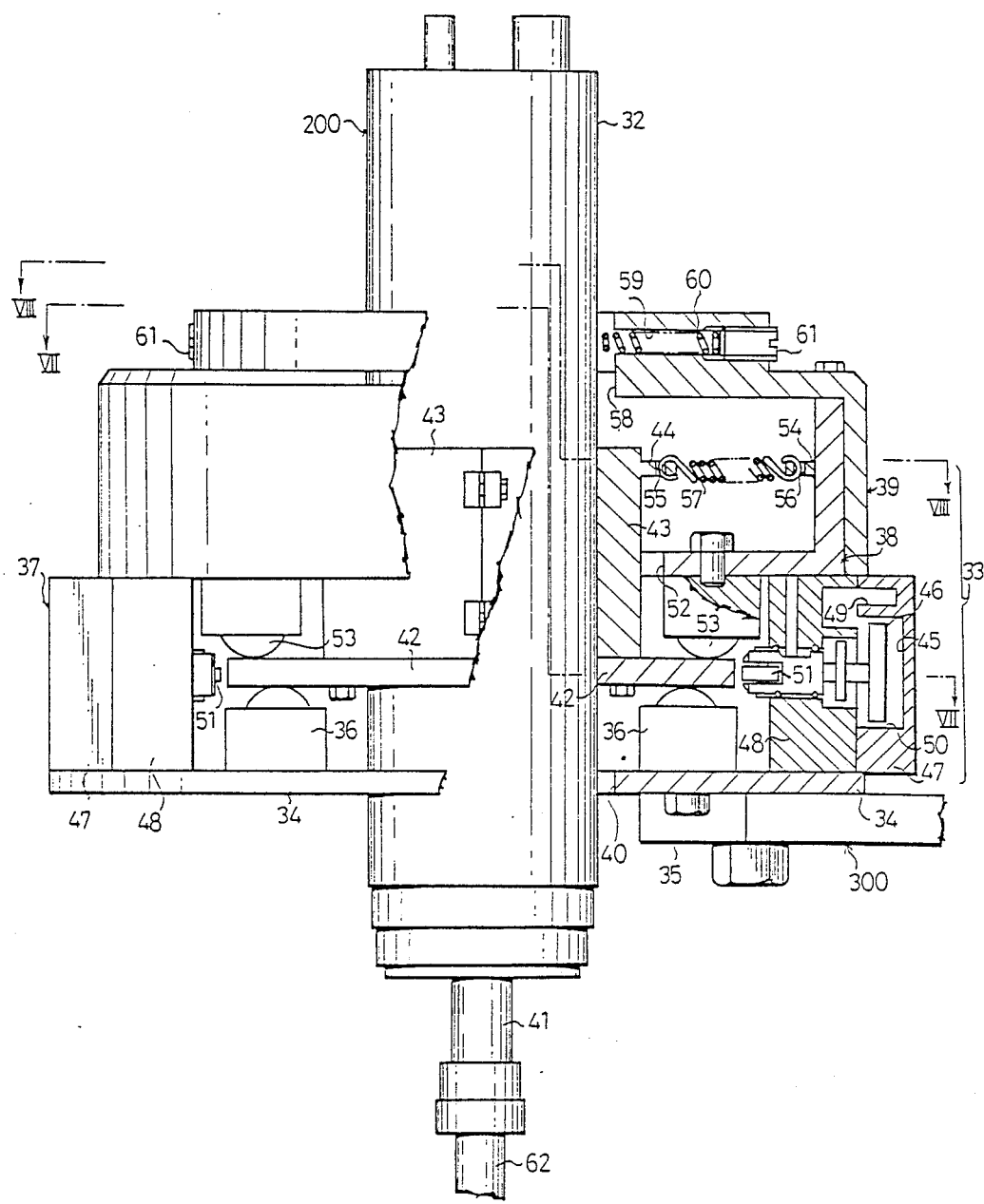
FIG. 6 is a vertical, partially sectional view of the flash removing means.

As shown in FIG. 6, a base plate 34 of the supporting member 33 is fixed to an arm 35 installed to an air cylinder 109 (see FIG. 1) of the below mentioned shifting means 300. On the top surface of the base plate 34 are mounted other members constituting the supporting member 33.

Such other members include three or more bearings 36 fixed on the top surface of the base plate 34 at the motor 32 side, a spring fastening member 38 mounted on three or more fluid-using members 37 further mounted on the top surface of the base plate 34, and a spring-holding member 39 fixed on the top surface of the spring fastening member 38 in a lid-like manner.

It should be noted that, in this embodiment, the bearings 36 are six in number, and the fluid-using members 37 are also six in number and serve as supporting members too.

The base plate 34 is provided with a hole 40 through which the motor 32 can pass; a clearance is defined between an inner periphery of the hole 40 and an outer periphery of the motor 32 to give a freely movable range for the motor 32.

The six bearings 36 are disposed in the rotationally symmetrical positions around the center axis as viewed from top. On the bearings 36 is fixed a supporting plate 42 of hollow disk shape on which the motor 32 is indirectly mounted through split coupling members 43 (double-cut) holding the outer periphery of the motor 32.

Figure 8:
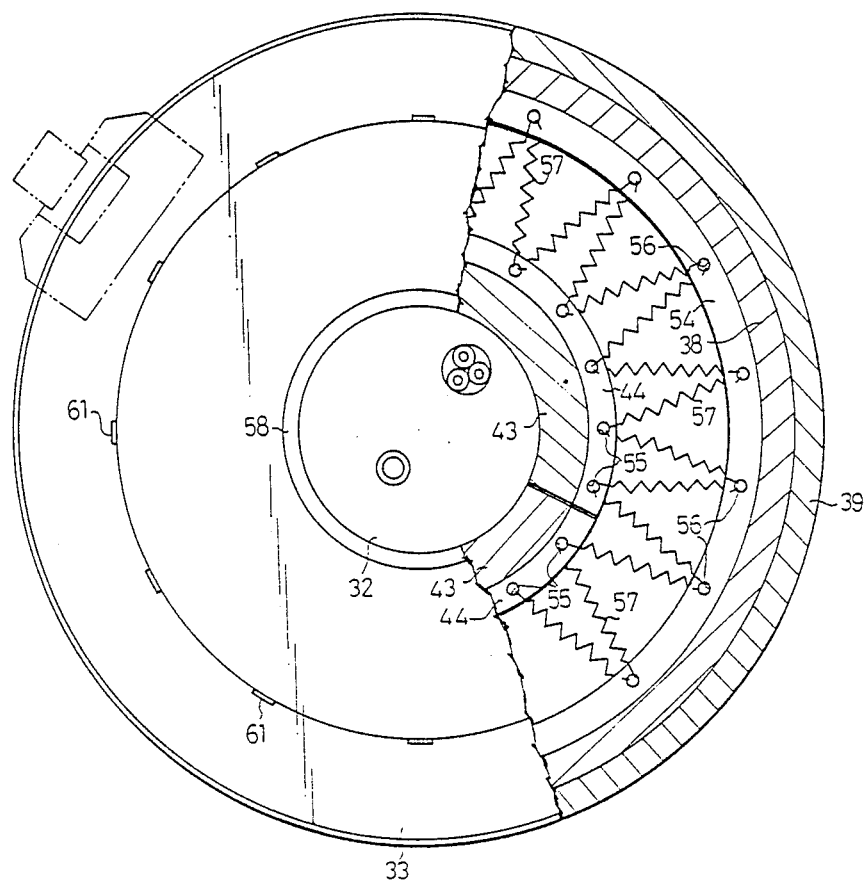
FIG. 8 is a partially sectional view taken along line VIII—VIII of FIG. 6.

As shown in FIGS. 6 and 8, the coupling member 43 is provided at its outer and upper periphery with a fastening portion 44 further provided with circumferentially equally-spaced fastening holes 55.

Figure 7:
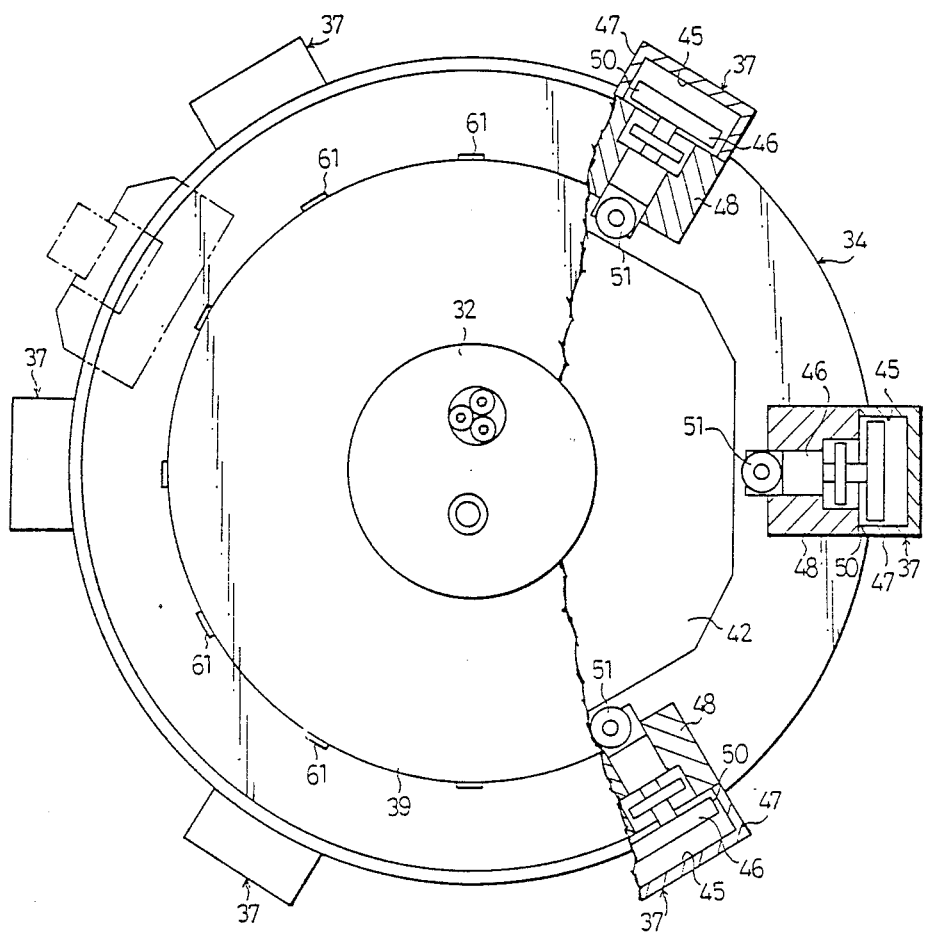
FIG. 7 is a partially sectional view taken along line VII—VII of FIG. 6.

As shown in FIGS. 6 and 7, each of the six fluid-using members 37 is composed of a combination of a cylinder 45 and a piston 46. The six fluid-using members 37 are disposed in the rotationally symmetrical positions around the center axis of the motor 32 and held in place.

The cylinder 45 is formed by two casings 47 and 48: the casing 47 is provided with an oil storage chamber 49 so that the oil in the cylinder 45 can enter into and go out from the oil storage chamber 49.

Between the piston 46 and the cylinder 45 is defined a clearance 50 for determining the response speed of the piston 46; the oil can pass through the clearance 50.

The piston 46 is provided, at its end facing the motor 32, with a bearing 51, so that the bearing 51 is in stably contact with the supporting plate 42 even if the supporting plate 42 is slightly shifted circumferentially together with the motor 32.

The spring fastening member 38 is provided at its bottom center with a hole 52 through which the coupling members 43 can pass; a clearance is defined between the inner periphery of the hole 52 and the outer peripheries of the coupling members 43. The motor 32 is freely movable within the clearance range.

The spring fastening member 38 is further provided at its under surface with bearings 53 which are equal in number to the bearings 36, so that the supporting plate 42 is smoothly movable between the two types of the bearings 36 and 53 in directions perpendicular to the rotary shaft 41 of the motor 32.

Therefore, the motor 32 is movable not in its axial direction but in directions perpendicular to the axial direction.

The spring fastening member 38 is further provided at its inner periphery with a fastening portion 54 at substantially the same hight as the fastening portion 44 of the coupling member 43: the former fastening portion 54 is provided with circumferentially equally-spaced three or more fastening holes 56 as shown in FIG. 8.

The holes 56 are, furthermore, so located that the straight line connecting the hole 56 and the axis of the motor 32 passes between two fastening holes 55 of the coupling member 43.

Tension springs 57 are fastened among the two kinds of fastening holes 55, 56 in a zigzag manner; the two tension springs 57 fastened to one fastening hole 55 or 56 give a resultant force passing through the axis of the motor 32.

Therefore, the motor 32 is pulled radially toward the spring fastening member 38 to be balanced and held in the standard position.

The spring holding member 39 also is provided at its top center with a hole 58 through which the motor 32 can pass; a certain clearance is defined between the inner periphery of the hole 52 and the outer periphery of the motor 32 so that the motor 32 is freely movable within the clearance range.

The spring holding member 39 is further provided at its top with three or more through holes 59 extending toward the axis of the motor 32; compression springs 60 are inserted into the through holes 59.

Plugs 61 are threadably fitted into the through holes 59 containing the compression springs 60 so as to compress the springs 60 to press the motor 32 from radially outside and hold it in the standard position.

Shifting Means 300

There will next be described the shifting means 300.

As shown in FIGS. 1 and 2, the shifting means 300 is provided to shift the flash removing means 200 toward the ring 2 on the fixing means 100. The shifting means 300 is composed of, in the flash removing apparatus 1, a base 101 disposed to face the base 116 of the fixing means 100, a transversely shifting device 102 mounted on the top surface of the base 101, a longitudinally shifting device 103 mounted on the transversely shifting device 102 and having a moving direction intersecting that of the transversely shifting device 102 at right angls, and a vertically shifting member 104 installed to the longitudinally shifting device 103 at the fixing means 100 side.

The transversely and longitudinally shifting devices 102, 103 are of the known structures; they are movable back and forth and right and left in FIG. 2 within a range slightly larger than the diameter of the ring 2 fixed on the fixing means 100.

These shifting devices 102, 103 are driven by drivers (not shown) contained in themselves.

As shown in FIG. 2, control means 17 is housed in the base 101; the flash removing means 200 mounted on the vertically shifting member 104 is also movable up and down according to the program stored in the control means 17, allowing the three-dimensional shift to be accmplished.

The vertically shifting member 104 is provided with two rails 105, 106 fixed thereto: the two rails extend vertically in parallel. The flash removing means 200 and the below mentioned solidified gate cutting means 400 are movable along the rails 105, 106.

Two air cylinders 107, 108 are installed to the vertically shifting member 104: the air cylinder 107 is movable together with an air cylinder 109 installed to the flash removing means 200 to shift up and down the flash removing means 200.

The air cylinder 108 allows the below mentioned solidified gate cutting means 400 to be shifted up and down. The air cylinders 107, 108, 109 are operated by air valves (not shown) according to the signals from the control means 17.

The control means 17 are of the known devices such as a storage, processing control device and a microcomputer. It is installed to the base 101 so as to control start-up and stop of the drivers for the flash removing means 200 and the longitudinally and transeversely shifting devices 103, 102, and start-up and stop of the air cylinders 107, 108 installed to the vertically shifting member 104, the air cylinder 109 and other devices.

There will now be described the flash removing method according to the invention using the above mentioned flash removing apparatus.

First, after taken away from the dies, the ring 2 has its solidified gate cut off and is mounted on the ring holding member 7 of the fixing means 100.

It should be noted that a suitable boss fixing member 15 is beforehand selected from many jigs to match the type of the ring 2, i.e. to match the boss 124 of the ring 2, and fixed to the fastening plate 11.

At the time of the setting of the boss fixing member 15, the claw portion 26 provided with the boss fixing member 125 permits an electric signal to be transferred to the control means 17, the electric signal depending on the number and the positions of the claws.

The control means 17 receives the electric signal and generates, according to the program corresponding to the signal, required signals for the operations of the transversely and longitudinally shifting devices 102, 103 and the air cylinders 107, 109 to shift the flash removing means 200.

According to these signals, there are operated the transversely and longitudinally shifting devices 102, 103 and the air cylinders 107, 109, so that the reamer 62 of the flash removing means 200 is brought into contact with the flash-forming region of the ring 2 with a predetermined pressing force while being rotated as shown in FIG. 3.

The pressing force applied to the flash-forming region is made minimum possible but sufficient for the reamer 62 to cut the flash 4.

Simultaneously with the contact with the flash-forming region, the reamer 62 is shifted along the inner periphery of the ring 2 while being pressed against it; thereafter the spoke portion of the ring 2 is similarly processed.

In completion of the flash removal from the inner periphery of the ring 2, the reamer 62 of the flash removing means 200 is similarly shifted along the outer periphery of the ring 2 while being pressed against it.

During the contacting and shifting process, the motor 32 and the supporting member 33 are held with the below mentioned positional relationships in the flash removing means 200.

Where the ring 2 is evenly formed to give no undulation at the flash-forming region, there would be no problems. In practice, however, the undulation exists within the tolerance; the flash 4 would be formed on the undulation.

If there is used the flash removing apparatus of the related art allowing the positional relationships between the motor 32 and the supporting member 33 to be fixed, as the cutter is brought into contact with the flash-forming region having much undulation while being shifted, the flash removing process would be affected even if using the reamer having the normal clearance angle of zero degree.

For example, excessive removal would occur to invade the armoring material 3 itself, or insufficient removal would occur to leave residual flash, leaving inferior traces after the removal.

In contrast, the flash removing means 200 according to the present invention permits the motor 32 to be surrounded by the compression springs 60, the tension springs 57 and the fluid-using members 37, so that the motor 32 is freely movable in directions perpendicular to the axial direction of the motor 32. Therefore, as the reamer 62 encounters the undulation it tends to move along the undulation.

In other words, the positional relationships between the motor 32 and the supporting member 33 tends to vary.

The variation of this positional relationships, in turn, causes displacements of the compression springs 60, the tension springs 57 and the fluid-using members 37. However, the supporting member 33 can not withstand the displacements of the springs 60, 57 and the fluid-using members 37, so that the supporting member 33 is displaced. Therefore, the positional relationship between the motor 32 and the supporting member 33 comes to the standard position which is the position before the reamer 62 encounters the undulation, or comes to near the standard position; the motor 32 returns to have the previous positional relationship to the supporting member 33.

Namely, the compression springs 60, the tension springs 57 and the fluid-using members 37 serve as a return member allowing the positional relationship of the motor 32 to the supporting member 33 to always tend to return to the standard relationship. In the present invention, the springs 60, 57 and the fluid-using members 37 are totally called a return member 66.

It should be noted that, in this case, the shifting means 300 have to permit the supporting member 33 to be displaced.

After all, the pressing force applied to the motor 32 from the supporting member 33 through the compression springs 60, the tension springs 57 and the fluid-using members 37 becomes similar to the previous value, so that the flash 4 on the undulation can be cut off without leaving uneven traces as well as the flash 4 on other regions.

As can be seen from above, using the apparatus according to the present invention, the reamer 62 is shifted to follow the undulation of the ring 2, leaving beautiful traces after the burr removal from the ring 2 and preventing the commercial value from being lowered.

In addition, since the return member 66 is disposed around the motor 32, the reamer 62 can follow the undulation of the polymeric molded product in directions perpendicular to the axial direction of the motor 32.

There will next be described the result of the use of the burring reamer 62 for the operation of removing flash from the inner and outer peripheries of the steering wheel which is formed from urethane resin by the RIM forming.

As shown in FIG. 3, the reamer 62 is installed to the flash removing means 200 rotatable at a high speed of 10,000 rpm: the first type blades 63 are rotated clockwise in FIG. 5 to remove the flash.

The burring reamer 62 is held vertically; its side is brought into contact with the flash 4 of the ring 2. Since the clearance angle at the flank of the blade 63 is set substantially zero degree, the flank always slides along the product portion during the rotation. Therefore, the blade 63 does not invade the product portion, assuring reliable burr removal and leaving even traces after the removal.

Where the reamer 62 is installed to an end mill and rotated at a low rotational speed of 3,000 to 5,000 rpm, it may be preferable to use a reamer 62 provided with blades having small cutting angles. For example, the blades having cutting angles of 76 degress may be used for the rotational speed of 3,000 rpm.

In this case too, since the flank of the blade slides along the product portion, the blade does not invade the product portion, leaving even traces after the removal.

The reason why such blades having cutting angles of 76 degrees are used for the low rotational speed is as follows: if using the blades 63 having cutting angles of 90 degrees, uneven traces might appear after the removal at the low rotational speed of the reamer 62. This selection for the cutting angles, however, does not necessarily mean that the blades 63 can not be used for that case. In practice, using the 90 degrees would suffer from no problems.

Furthermore, for the usual rotational speed of 6,000 to 9,000 rmp, it is preferable to use the blades having varied cutting angles described below, assuring reliable cutting and leaving even traces after the removal.

For the flash removing operation for the relatively hard resins such as ABS resin and AAS resin, it is preferable to use the blades having acute cutting angles of 76 to 89 degress. On the other hand, for the flash removing operation for the relatively soft resins such as urethane resin and PVC resin, it is preferable to use the blades having obtuse cutting angles of 90 to 160 degrees.

As can be seen from above, the reamer 62 according to the invention is provided with blades having the normal clearance angles of zero degree; for the urethane resin, relatively soft resin, the flash removing operation is carried out by the reamer provided with blades having the cutting angles of 90 degrees at the low rotational speed. Therefore, this reamer is prevented from invading the product portion; the reamer is very easy to handle and suitable for the flash removing operation.

Furthermore, since the burring reamer 62 is held vertically and its side is brought into contact with the product from which the flash is to be removed, the removed flash 4 is discharged down from the grooves 64 and thus not collected in the grooves 64.

There will next be described the second embodiment of the present invention by referring to FIGS. 9 to 14. This embodiment uses only the flash removing means 200 of the first embodiment as a separate flash removing apparatus.

The flash removing means 200 shown in FIGS. 6 to 8 are taken away from the shifting means 300 shown in FIGS. 1 and 2 to obtain a separate flash removing apparatus. This apparatus is also provided with the reamer 62 having the shape shown in FIGS. 4 and 5 and installed to the rotary shaft 41 of the motor 32. The return member 66 includes six compression springs 60 and six tension springs 57 installed to the supporting member 33. The fluid-using members 37 contain no oil so as not to operate.

The motor 32 is easily movable in directions perpendicular to the axis thereof; where the motor 32 receives a force from outside to be displaced in a direction perpendicular to the axis thereof, it tends to return soon to its standard position as the force disappears.

This flash removing apparatus is held by a hand; the ring 2 having the flash 4 is fixed to the fixing means 100 shown in FIGS. 1 and 2. The armoring material 3 of the ring 2 is made of soft polyurethane.

As shown in FIG. 3, the reamer 62 is shifted along the ring 2 while being pressed against the flash-forming region of the ring 2 with a substantially constant pressing force. As the result, even if the flash-forming region is on the undulation of the armoring material 3, the reamer 62 follows the undulation and cuts and removes the flash 4 so that no excessive removal nor insufficient remvoval occur.

Thus, the apparatus according to this embodiment serves as the flash removing apparatus by being held even by a hand.

As described above, the flash removing apparatus according to the present invention permits the flash removal from the polymeric molded products having undulation to be performed. In practice, the polymeric molded products just after injection molding have the solidified gates 9 in addition to the flash 4 as mentioned previously. Therefore, it is preferable to cut and remove the solidified gate 9 before the removal of the flash 4. There will now be described cutting means for the solidified gate by referring to FIGS. 1, 2 and 9 to 13.

Now, description is directed to means for cutting the solidified gate which is inevitably produced in the injection molding process: the solidified gate cutting is carried out before the flash removing.

As shown in FIGS. 1 and 2, we now consider the armoring material 3 of the ring 2 having the solidified gate 9 and the flash 4 as the polymeric molded product. Description is now directed to solidified gate cutting means 400 for cutting the solidified gate 9, and shifting means 300 for shifting the solidified gate cutting means 400 toward the fixing means 100.

It should be noted that the fixing means 100, the flash removing means 200 and the shifting means 300 have substantially the same structures as those of the first embodiment mentioned above.

Figure 9:
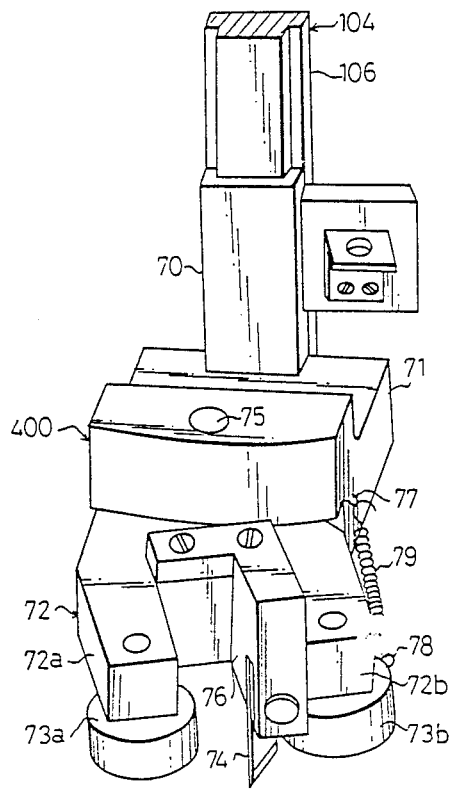
FIG. 9 is a perspective view of solidified gate cutting means.

The solidified gate cutting means 400 is, as shown in FIG. 9, movable up and down, through a sliding member 70, on a rail 106 of a vertically shifting member 104 installed to the shifting means 300.

To the sliding member 70 is fixed a fixing member 71 which is provided at its front margin center with a pivot shaft 75.

Under the fixing member 71 is installed a U-shaped pivotal member 72 movable around the pivot shaft 75.

The pivotal member 72 has two arms 72a, 72b provided at their under sufaces with rollers 73a, 73b through shafts: the rollers serve as followers. Between the arms 72a and 72b is fixed a holding member 76 for a fixed cutter 74.

The fixed cutter 74 has a blade which is shaped obliquely and double-edged. Therefore, as the fixing cutter 74 is moved, a moving direction of the blade is stabilized while the blade is cutting the solidified gate 9.

The fixing member 71 is provided at its side with a hook 77 whereas the pivotal member 72 is provided at its side near the fixed cutter 74 with another hook 78: the hooks 77, 78 are arranged on the same side of the solidified gate cutting means 400. A spring 79 is fastened to the hooks 77, 78 under a tensional condition. Thus, unless an external force is applied to the swing member 71, the swing member 71 is in the position allowing the spring 79 to have the smallest length.

Figure 11:
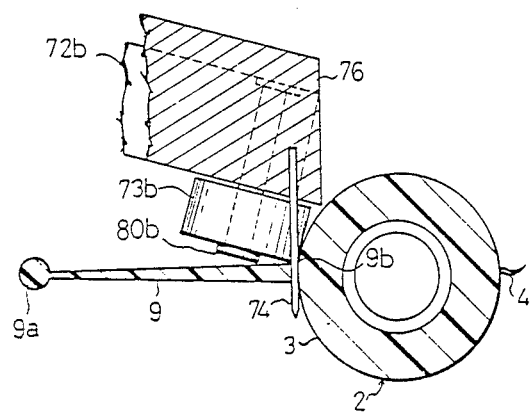
FIG. 11 is a sectional view showing the state that a stationary cutter is brought into contact with a ring.
Figure 15:
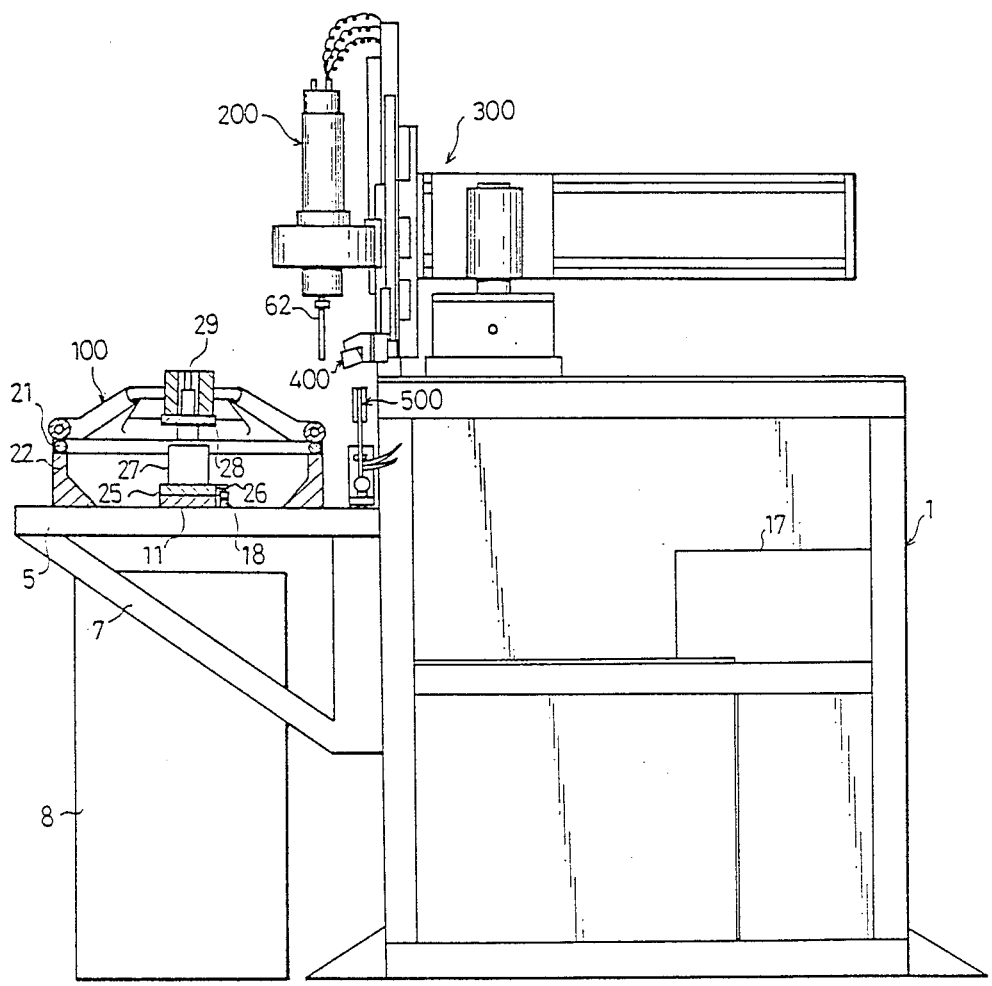
FIG. 15 is a side view showing a receiving jig of the third embodiment together with the total flash removing apparatus.
Figure 16:
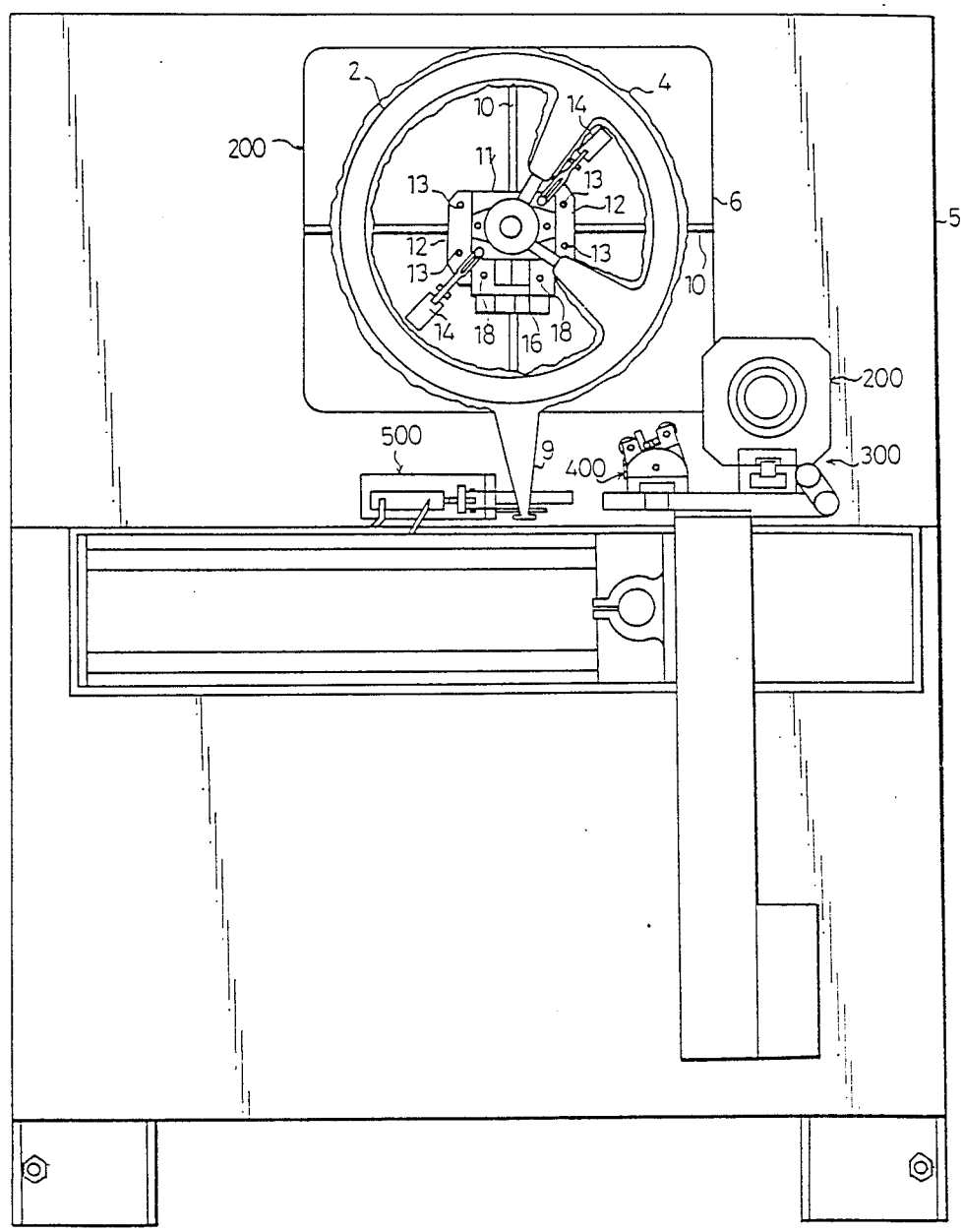
FIG. 16 is a plan view of the apparatus shown in FIG. 15.
Figure 19:
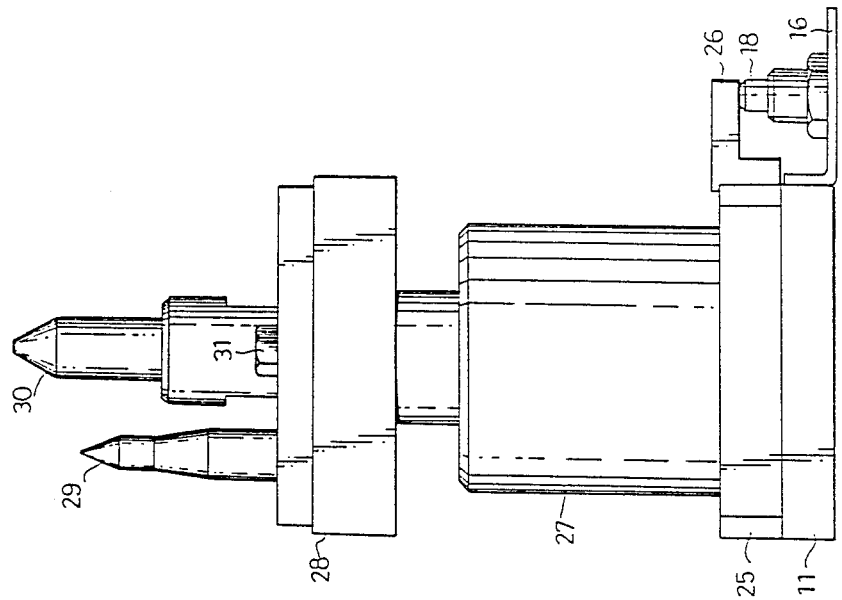
FIG. 19 is a side view of the supporting member of the third embodiment.
Figure 17:
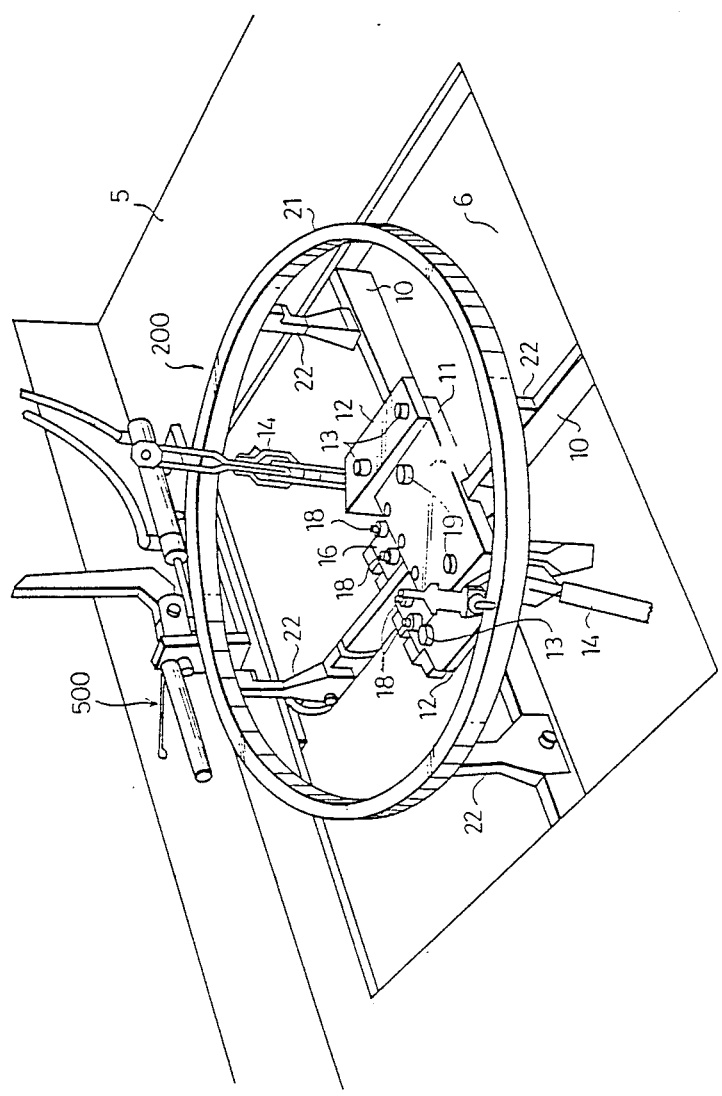
FIG. 17 is a perspective view of the receiving jig of the third embodiment.
Figure 18:
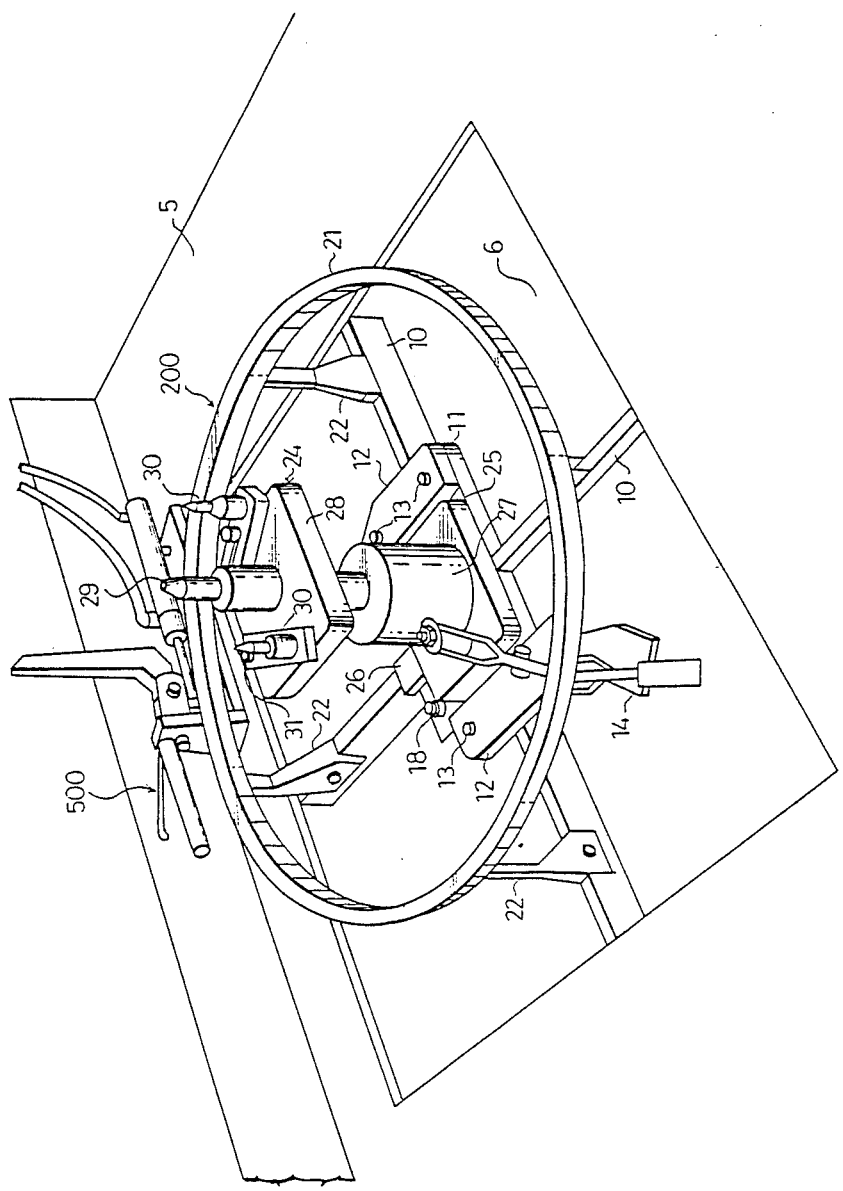
FIG. 18 is a perspective view showing the state that a supporting member is mouted on the receiving jig shown in FIG. 17.
Figure 20:
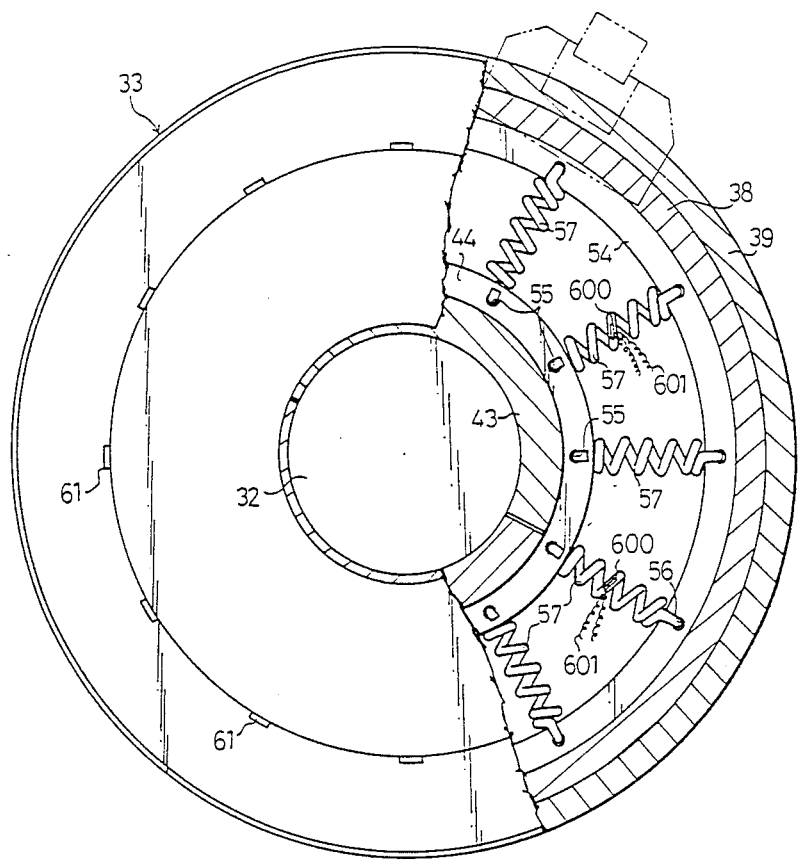
FIG. 20 is a transverse, partially sectional view of the essential portion of the fourth embodiment.

As shown in FIG. 11 showing a side view of the fixed cutter 74, the fixed cutter 74 is so disposed as to extend in a direction intersecting the axial direction of the shaft 80b (80a) of the roller 73b (73a) at a certain angle.

This arrangement permits the trace of the fixed cutter 74 on the ring 2 to be different in position from the trace of the roller 73b on the ring 2. Otherwise the roller 73b moving in front of the fixed cutter 74 would prevent the cutting of the solidified gate 9.

In addition to the solidified gate cutting means 400 mentioned above, holding means 500 for holding an end 9a of the solidified gate 9 is installed below the solidified gate cutting means 400 and on the top surface of the fixing means 100 as shown in FIGS. 1 and 2.

Figure 10:
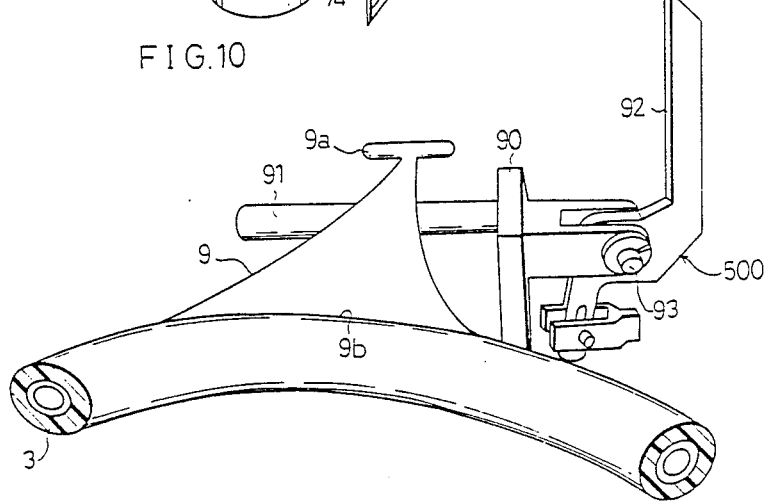
FIG. 10 is a perspective view of solidified gate holding means.

The holding means 500 has, as shown in FIG. 10, a stationary bar 91 fixed to a frame 90, and a pivotal bar 92 pivotally movable over the stationary bar 91; the solidified gate 9 is to rest on the stationary bar 91.

The pivotal bar 92 is pivotally movable around a pivot shaft 93 mounted in the frame 90. The pivotal bar 92 is rotated by an air cylinder 94 which is operated by the control means 17.

The thus constituted solidified gate cutting means 400 is used in the following manner.

First, as shown in FIGS. 1 and 2, the ring 2 having the flash 4 and the solidified gate 9 is set on the ring holding member 7 of the fixing means 100. This setting is similar to that in the first embodiment.

Next, the end 9a of the solidified gate 9 is, as shown in FIG. 10, put on the stationary bar 91; the pivotal bar 92 is pivotally moved to hold the end 9a between the two bars 91 and 92. These operations are carried out by the control means 17 or separate ring set means (not shown).

The end 9a of the solidified gate 9 is thus held before the use of the solidified gate cutting means 400; the solidified gate 9 is under a tensional condition between the ring 2 and the holding means 500. Therefore, the contact of the cutter 74 with the tensional solidified gate 9 will permit the cutting of the solidified gate to be carried out easily and reliably.

The holding means 500 is more effective in applying to the solidified gate 9 made of soft materials such as urethane resin. If using no holding means 500, the resultant force made of two forces would act on the cut region of the solidified gate 9 at the time of cutting: a tangential force from the cutter 74 and a downward force by the weight of the solidified gate 9 itself. Therefore, in the case of the soft materials, as the cutting is nearly completed, the separated portion of the solidified gate 9 would hang down so that the downward force by the weight itself becomes dominant to allow the cutting in the tangential direction to be not reliably carried out. Accordingly, no use of the holding means 500 in the case of the soft materials would cause a part of the solidified gate to be left.

Figure 12:
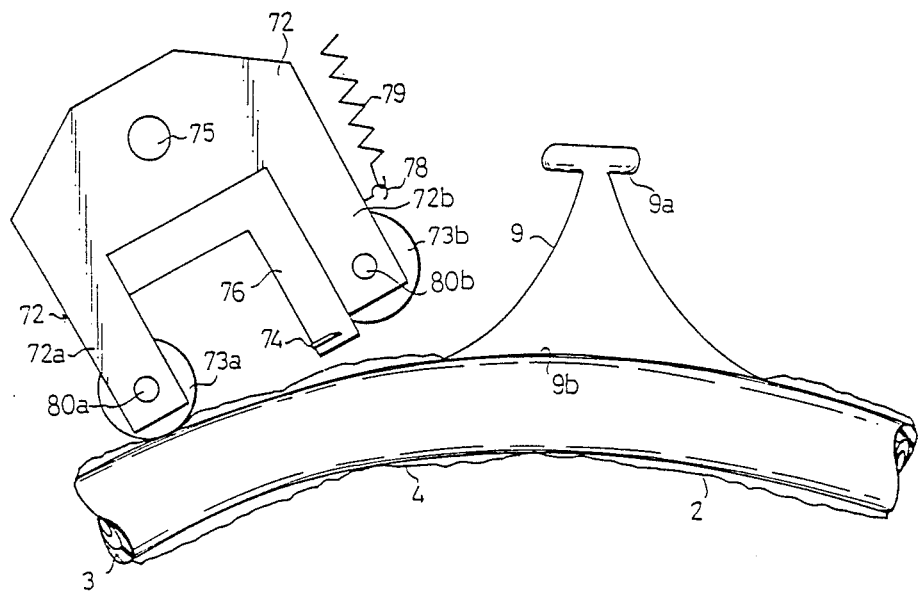
FIG. 12 is an explanatory view showing the state that the solidfied gate cutting means is in initial contact with the ring.

After the ring 2 is fixed on the fixing means 100, the transeversely and longitudinally shifting devices 102, 103 and an air cylinder 108 installed to the vertically shifting member 104 are operated by the control means 17 to shift the solidified gate cutting means 400 toward the outer periphery of the ring 2 as shown in FIG. 12. At this time, the solidified gate cutting means 400 is shifted in a manner that the roller 73a much away from the fixed cutter 74 would be initially brought into contact with the outer periphery of the ring 2. If the roller 73b near the fixed cutter 74 is initially brought into contact with the ring 2, there would be increased the possiblity that the fixed cutter 74 cuts deeply into the flash 4 and the solidified gate 9.

Of course, if more appropriate approaching method is usable the approaching method shown in FIG. 12 is not required. Namely, there is considered another approaching method that the fixed cutter 74 extends in the tangential direction of the ring 2 and the approaching direction of the solidified gate cutting means 400 is consistent with the normal direction of the ring 2 while the cutting means 400 is approaching the outer periphery of the ring 2. In this case, one of the rollers 73a and 73b may be omitted.

The rollers 73a, 73b are brought into contact, at their edges, with the root 9b of the solidified gate of the ring 2 as shown in FIG. 11.

Next, the cutting means 400 is shifted toward the solidified gate 9; the rollers 73a, 73b are moved along the root 9b of the solidified gate 9. During this operation, the pivotal member 72 is gradually rotated around the pivot shaft 75 of the fixing member 71 toward the no spring 79 side. As the rollers 73a, 73b are moved, the fixed cutter 74 mounted on the pivotal member 72 through the holding member 76 is also moved. Thus, the fixed cutter 74 cuts off the solidified gate 9 depending upon the rollers movements along the outer periphery of the ring 2. Since the cutter 74 is directed to the tangential direction of the ring 2, it does not cut into the armoring material 3.

Furthermore, the cutting requires a short time; the use of this apparatus increases the work efficiency.

In completing the cutting off of the solidified gate 9, the solidified gate cutting means 400 is separated away from the ring 2; the pivotal member 72 returns toward the hook 78 side by the action of the spring 79 to become ready for the next cutting cycle.

After the completion of the cutting operation for the solidified gate 9, the flash removing operation is carried out as described in the first embodiment, completing both the flash removal and the gate cutting.

Accordingly, both the flash removal and the gate cutting for the polymeric molded product are carried out completely automatically by using the solidified gate cutting means 400 together with the control means 17 and other means.

There will now be described the third embodiment of the present invention by referring to FIGS. 15 to 19. The flash removing apparatus according to the present invention has a main body 1 and a supporting plate 5 installed on the front surface of the main body 1 and projecting from it: the supporting plate 5 has the same width as the main body 1. The supporting plate 5 is provided at its center with a through hole 6. To the under surface of the supporting plate 5 is fixed a V-shaped reinforcing arm 7. A chute 8 is provided below the supporting plate 5 to receive the flash coming down from the through hole 6 during the flash removing operation.

Two supporting rods 10 extend over the through hole 6 of the supporting plate 5 in a cruciform manner. A fastening plate 11 of rectangular shape is fixed to the central region of the rods 10 by welding or the like. To the facing short sides of the fastening plate 11 are fixed positioning plates 12 of trapezoidal shapes through bolts 13. Each of the positioning plates 12 is provided with a clamp 14 for fixing the below mentioned supporting member.

One of the long sides of the fastening plate 11 is provided with a stepped switch plate 16. On the top surface of the switch plate 16 are arranged upward-directed four switches 18 for changing the program of the control means 17 provided in the main body 1. Pressing the switches 18 permits the program of the control means 17 to be determined appropriately. The fastening plate 11 is further provided at its top surface with two positioning projections 19.

Furthermore, a circular receiving stand 21 is arranged around the fastening plate 11: the receiving stand 21 has a rectangular cross section, is centered around the first pin of the below mentioned supporting member, and is installed to the supporting rods 10 through connecting members 22.

On the top surface of the fastening plate 11 is mounted the bottom plate 25 of a supporting member 24 which is held in position horizontally by the inner sides of the positioning plates 12 and the positioning projections 19, and vertically by the clamps 14.

The bottom plate is provided at its switch plate 16 side with a projecting claw portion 26 for pressing the switches 18 as the supporting member 24 is mounted on the fastening plate 11. The shape of the claw portion 26 varies with the kind of the supporting member 24, so that the number of the switches 18 to be pressed varies with the kind of the supporting member 24.

The bottom plate 25 is provided at its top surface with a bearing plate 28 of rectangular shape through a connecting member 27 of cylindrical shape. On the top surface of the bearing plate 28 is mounted the first pin 29 over which the boss 124 of the steering wheel is to be fitted. At the both sides of the first pin 29 are arranged two second pins 30 also for receiving the boss 124. The second pins 30 are fastened to the bearing plate 28 by bolts 31, so that their distances from the first pin 29 can be altered by changing the positions of the bolts 31.

There will next be described the flash removing method for the steering wheel using the flash removing apparatus of the third embodiment, together with its operation.

First, a suitable supporting member 24 is selected to match the kind of the steering wheel from which the burr is to be removed, and mounted to the fastening plate 11 and fastened by the clamps 14.

At this time, since the claw portion 26 for pressing the predetermined set of the switches 18 is formed on the bottom plate 25 of the supporting member 24, the claw poriton 26 presses down the predetermined set of ones of the four switches 18. This switching operation allows a signal to be transferred to the control means 17 for selecting the program for the flash removing operation for the selected steering wheel. Thus, the burr cutting means 200 is operated according to the program selected by the switching operation.

The flash removing operation for another ring 2 having different detail shape is carried out as mentioned below.

The clamps 14 are unlocked and the supporting member 24 is taken off. Another supporting member 24 is mounted and fastened by the clamps 14. The claw portion 26 formed on this supporting member 24 presses down a different set of the switches 18 from the previous case to generate a signal for selecting the program corresponding to this another ring 2. Thus, the flash removing means 200 permits the flash removing operation for this another ring 2 to be carried out.

In summary, this embodiment has the feature that the receiving stand 21 is provided with the switches 18 for changing the program of the control means 17, while the supporting member 24 is provided with the claw portion 26 for presseing a suitable set of the switches 18. Therefore, replacement of the supporting member 24 permits a different signal for the different supporting member 24 to be transferred to the flash removing means 200. Accordingly, complicated programming operations are omitted, the work efficiency is increased, and erroneous operations caused by erroneous programs are prevented.

Furthermore, since the second pins 30 are fastened to the bearing plate 28 by means of the bolts 31, the second pins 30 can be changed in positions in relation to the first pin 29. Such an adjusting mechanism is useful for the case of the flash removing operations for the rings 2 having the same flash-forming regions but different bosses in shapes.

Furthermore, since the apparatus of this embodiment has the feature that the through hole 6 is disposed below the receiving stand 21 and thus the removed flash 4 and the removed solidified gate 9 come down through the through hole 6 and are collected in the chute 8 arranged below the supporting plate 5. The useless removed flash 4 is not collected on the supporting plate 5 to make the flash removing operation easy.

There will now be described the fourth embodiment of the present invention by referring to FIGS. 20 to 24.

Figure 22:
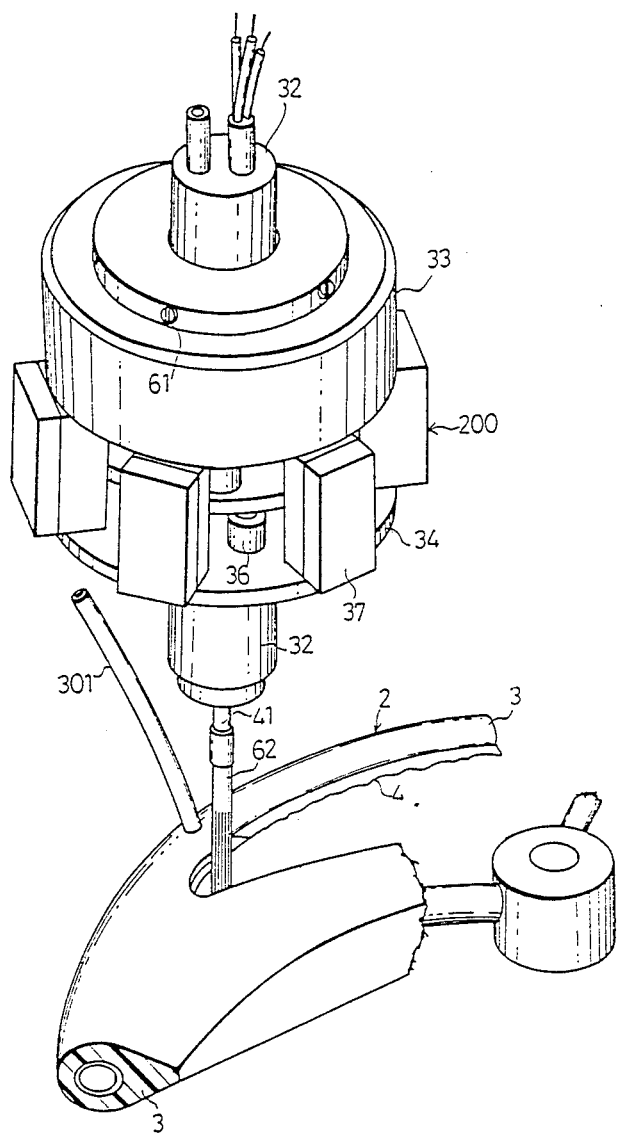
FIG. 22 is a perspective view of the flash removing means of the fourth embodiment.
Figure 23:
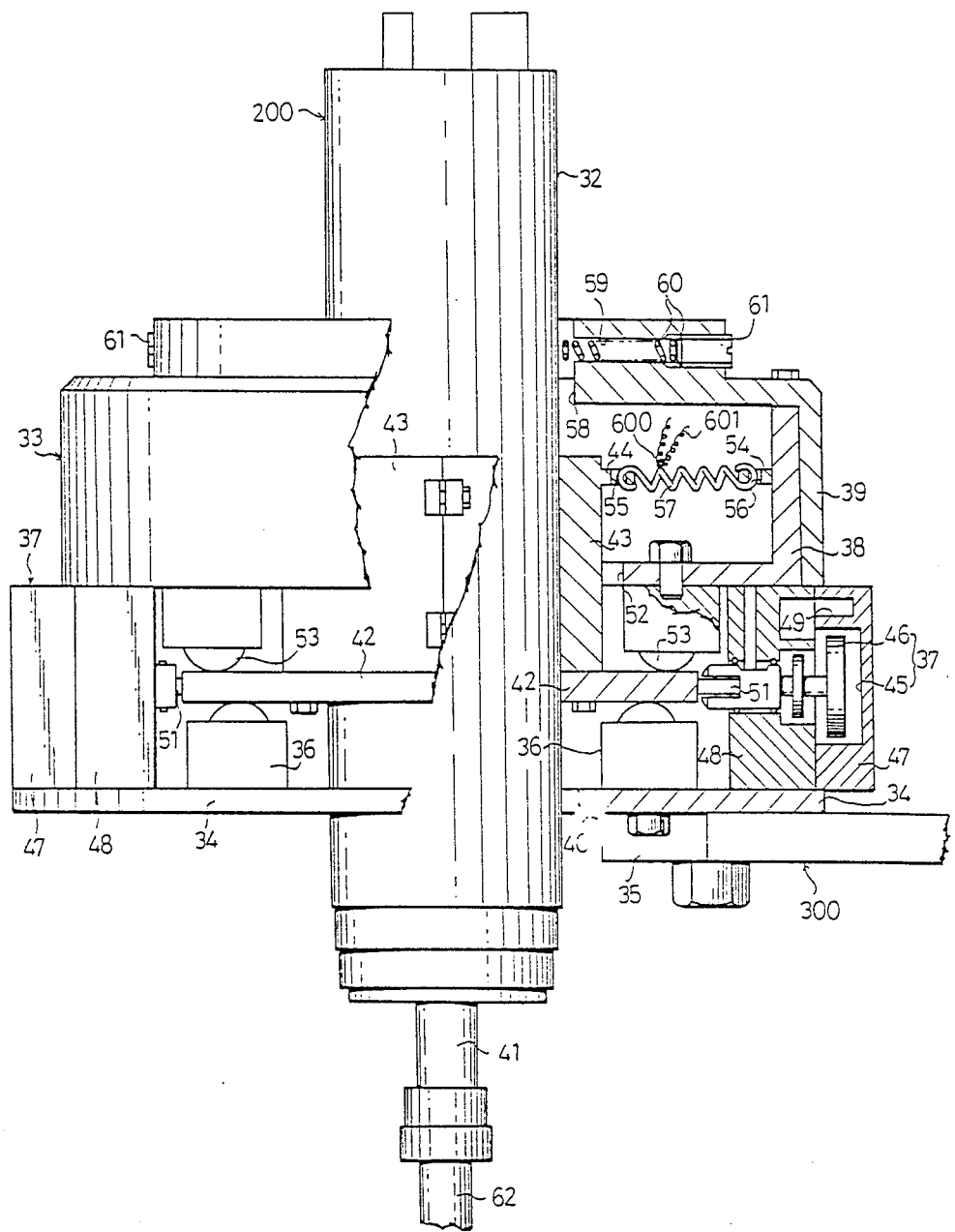
FIG. 23 is a vertical, partially sectional view of the flash removing means shown in FIG. 22.

The flash removing means of this embodiment, as shown in FIG. 22, has a nozzle 301 for blowing an air stream against the reamer 62 to prevent particle-like or strip-like removed flash from sticking to the reamer 62 during the cutting for the flash 4.

Sensors 600 are fitted to every other one of the tension springs 57 for sensing the load pressure against the reamer 62. The sensors 600 are strain gages for sensing strains of the springs 57: the strain gage is composed of a semiconductor gage which has an electric resistance varying with the strain of the spring 57. The variations of the electric resistances are transferred through lead wires 601 to the below mentioned A/D converter.

Figure 21:
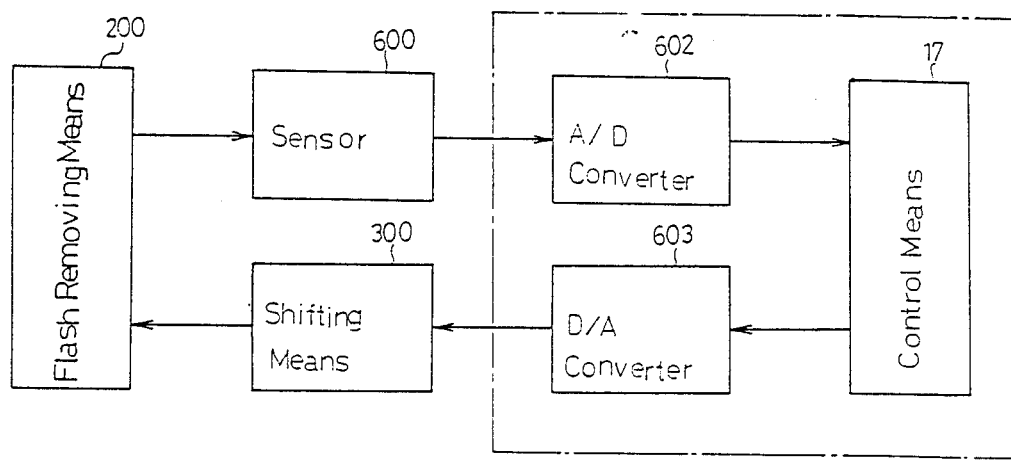
FIG. 21 is a control block diagram of the fourth embodiment.

As shown in FIG. 21, the lead wires 601 are connected to an A/D converter 602 which amplifies and processes the analogue signals from the sensors 600 and converts them into digital signals. The A/D converter 602 is further connected to the control means 17 which judges whether the strain data is within the predetermined range according to the program strored in itself beforehand.

The control means 17 is connected to a D/A converter 603, and transfers a control signal to the D/A converter 603 where the strain data is not within the predetermined range. The D/A converter 603 converts the digital signal from the control means 17 into an analogue signal and transfers it to the shifting means 300 for driving the floating mechanism (i.e. the freely movable mechanism for the motor 32), so that the shifting means 300 shifts the motor 32 to perform the floating.

Furthermore, the shifting means 300 may be provided with conveyer means 700 for conveying out the ring 2 from the fixed means 100 after completion of the removal of the flash 4 from the ring 2.

Figure 24:
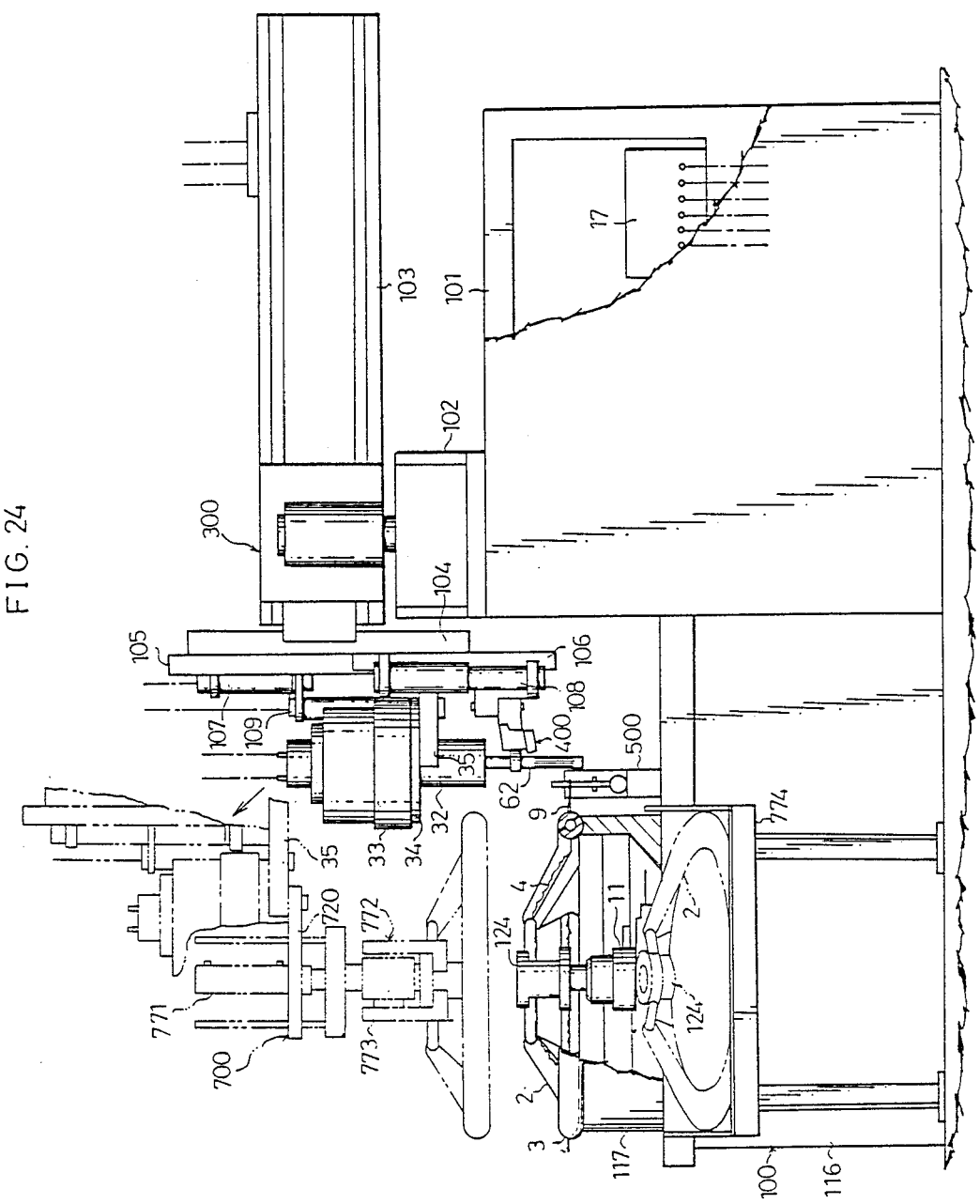
FIG. 24 is a side view showing the fourth embodiment together with the total flash removing apparatus.

As indicated by two-dot chain lines in FIG. 24, the conveyer means 700 is, for example, composed of a supporting member 770 fixed to the end of the arm 35 of the shifting means 300, an air cylinder 771 fixed to the supporting member 770 and expandable vertically, and the holding device 772 mounted to the lower end of the air cylinder 771.

The holding device 772 is provided with two holding members 773 arranged movable horizontally in opposed directions to each other so as to hold the boss 124 of the ring 2.

The operation of the shifting means 300 permits the conveyer means 700 to lift the ring 2 above the fixing means 100 and convey it out of the fixing means 100, for example convey it to a tray 774 disposed at the side of the fixing means 100 and store it in the tray.

There will now be described the operation and the effects of the thus structured embodiment.

First, the reamer 62 is brought into contact with the ring 2 with the predetermined pressing force while being rotated.

Since the springs 57 having the sensors 600 are arranged between the motor 32 and the supporting member 33, the reamer 62 mounted to the motor 32 receives a pressure from the armoring material 3 to permit the sensors 600 of the springs 57 to vary in strains. The strain values are transfered as analogue signals to the A/D converter 602 through the lead wires 601. The A/D converter 602 amplifies and processes the signals and transfers digital signals to the control means 17.

The control means 17 has stored the relationship between the strains of the springs 57 and the degree of beauty of the armoring material 3 after the flash removal: the relationship has been obtained by various preliminary experiments. Therefore, the control means 17 can judge whether the inputted strains are within the optimum range.

If the inputted data of the strains are out of the range, a control signal is transferred to the D/A converter 603. The D/A converter 603 converts the digital signal into the analogue signal and transfers it to the shifting means 300, so that the transversely and longitudinally shifting devices 102, 103 are shifted to allow the supporting member 33 to be shifted to permit the axis of the motor 32 to be within the proper range.

Accordingly, in this embodiment, the flash removing operation is carried out while the reamer 62 is being pressed against the armoring material 3 with the predetermined pressing force under the condition that the strains of the sensors 600 fitted to the springs 57 are controlled within the predetermined range. Since the motor 32 is surrounded by the springs 57 and other members, the strains are within the predetermined range not depending upon the orbital position of the motor 32. Therefore, the pressing force against the armoring material 3 is controlled within the predetermined range.

Where the armoring material 3 has the undulation at the flash-forming region, the reamer 62 is brought into contact with the undulation during the flash removing operation. At this time, the strains of the sensors 600 fitted to the springs 57 vary. As the result, the shifting means 300 are operated to regulate the strains of the springs 57 to the predetermined range in the same way as previously mentioned. Accordingly, even if the armoring material 3 has the undulation at the flash-forming region, the reamer 62 is brought into contact with the flash-forming region always with the predetermed pressing force.

As the result, the operation of removing the flash 4 from the armoring material 3 is carried out without excessive removal nor insufficient removal, leaving beautiful traces after the flash removal. Therefore, using the floating mechanism of this embodiment prevents the commertial value of the steering wheel from being lowered even where the flash removing operation for the molded steering wheel is automated.

It should be understood that the fourth embodiment is not limited to the above structure, and the following structure may be used:

(1) The sensors 600 may be fitted to all of the springs 57 and the data from a plurality of the sensors 600 may be processed so that the shifting means 300 are operated to allow the motor 32 to be in the floating condition. In addition, the sensors 600 may be of the type sensing the hydraulic pressure of the fluid-using members 37 to allow the shifting means 300 to be operated by the signal from these sensors.

(2) Although the above embodiment uses the supporting member 33 provided with springs 57, metal plates to which the sensors 600 are fitted may be used in place of the springs 57. Furthermore, there may be used ceramics or polymers which are of piezo-electric element themselves, for example polyvinylidene flouride.

(3) The springs 57 surrounding the motor 32 may be increased in number so that more sensors 600 are arranged circumferentially to control the strains. In this case, the pressing force of the motor 32 against the armoring material 3 is regulated within the predetermined range in and radial direction.

Furthermore, if the springs 57 are low in number, the control means 17 may have stored a suitable program so that the control range is appropriately altered in consideration of the direction of the pressing force and the resultant force of the spring forces and the like in the same direction as the pressing force.

(4) The apparatus may be controlled so that the pressing force is altered in consideration of the property of the armoring material 3.

While there have been concretely described the first to fourth embodiments of the present invention, it should be understood the present invention is not limited to the embodiments and, for example, the following forms may be used:

For the first to the fourth embodiments, (1) The polymeric mold products may be any kind of polymers as long as having the flash 4, and may be of any shape as long as the reamer 62 can be brought into contact with them.

For the first, second and fourth embodiments, (1) The flash-forming region may be on flat surfaces or curved surfaces of the polymeric molded products. Where the flash 4 exists on the flat surfaces, the flash removing means 200 may be pressed against the flat surfaces in the direction perpendicular thereto and shifted along them.

Where on the curved surfaces, the flash removing means 200 may be pressed against the curved surfaces in the direction perpendicular to the tangential line at the region from which the flash is to be cut off.

(2) A grindstone of cylindrical shape or another shape may be mounted on the vertical motor 32 in place of the reamer 62 to perform grinding.

(3) The flash removing operation using the apparatus according to the present invention may be applied to all of synthetic resin products such as urethane resin, polyethylene, polypropylene and so forth.

Figure 25:
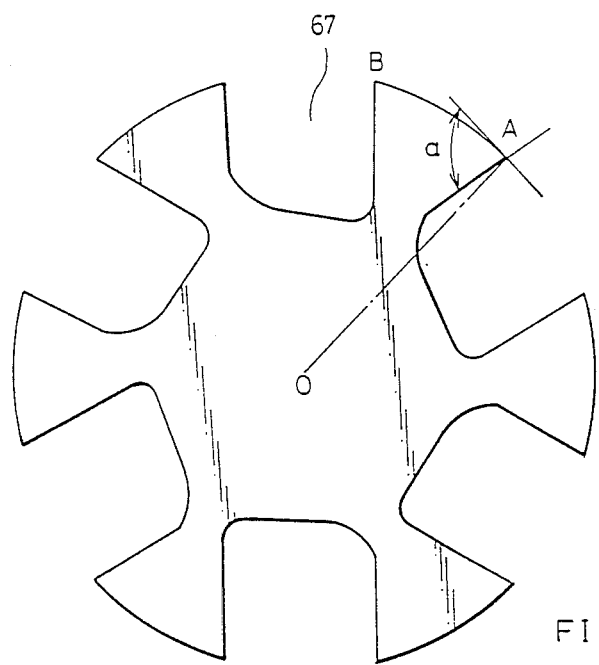
FIGS. 25 and 26 are front views of other reamers.
Figure 26:
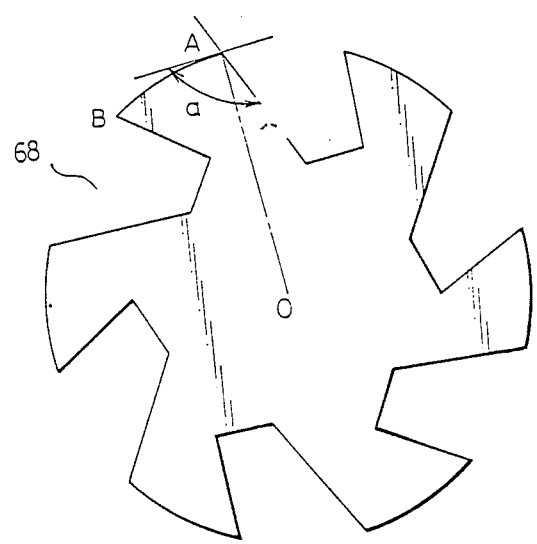
Figure 27:
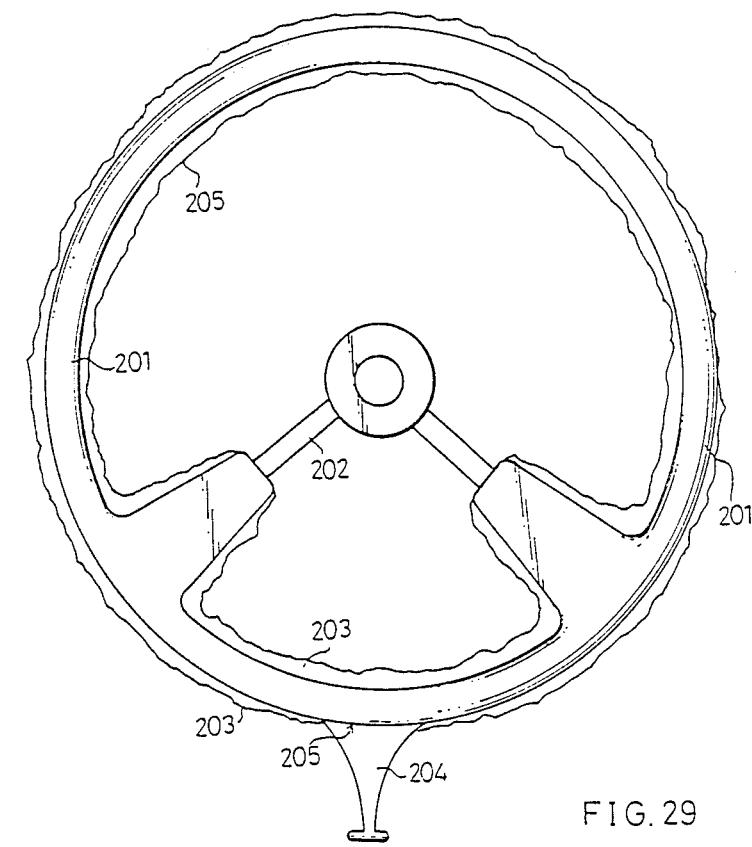
FIG. 27 is a front view showing the state that the flash and the solidified gate are attached to the ring in the related art.
Figure 28:
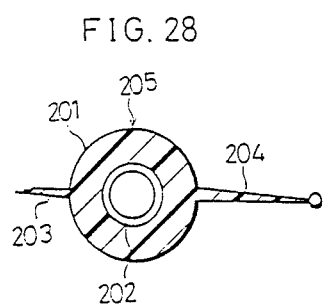
FIG. 28 is a sectional view of the ring shown in FIG. 27.
Figure 29:
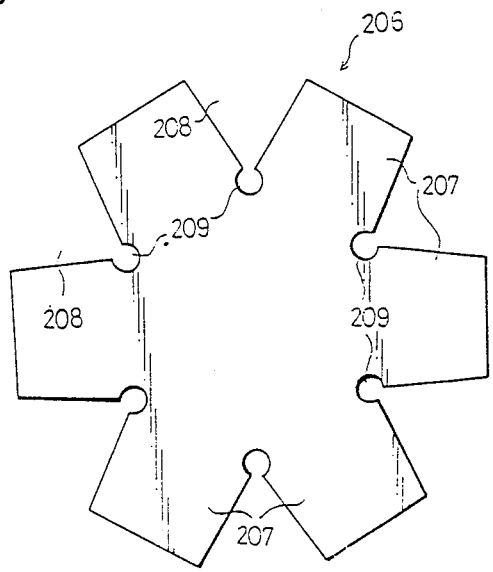
FIG. 29 is a front view of the reamer of the related art.

(4) The blades 63 of the reamer 62 are not limited to the sizes and the shapes of the above embodiments. For example, the reamer 62 may have blades 67 shown in FIG. 25 or blades 68 shown in FIG. 26.

(5) The blades 63 of the cutter (reamer 62) are not limited to the straight shape extending in parallel to the axial direction, but may be helical shapes.

(6) A cutter (reamer 62) may be a stepped type having a small diameter portion and a large diameter portion, a tapered type reamer of core shape, or a reamer having a front end portion of semisphere shape and a rear end portion of column shape.

For the first, third and fourth embodiments, (1) The fixing means 100 is not limited to the application for the flash removing operation for the ring 2, but may be modified to match the flash removing operation for the usual synthetic resin products.

(2) The fixing means 100 may be plural, for example three, so that a plurality of the rings 2 are successively processed by the flash removing operation.

For the first and second embodiments, (1) The return member 66 may contain only the compression springs 60, or only the tension springs 57, or the both types of the springs.

(2) The fluid-using members 37 may have the feature that fluid such as air, water, oil or the like is positively supplied into the cylinder 45 from outside.

For the first and third embodiments, (1) The switches 18 may be of mechanical, pneumatic of hydraulic types other than the electric type.

For the third embodiment, (1) The switches 18 may be provided on the fastening plate 11 while the projections for pressing the switches 18 may be provided on the bottom plate 25. This switching arrangement is not limited to the above or other specific one. Namely, any structure may be adopted as long as the displacement of the supporting member 24 causes the change-over of the switches 18.

(2) Although the third embodiment uses the receiving jig composed of the receiving stand 21 and the supporting member 24, the receiving jig may be of any type as long as the replacement of the replaceable jig requires replacement of other members.

Since it is apparent that many other modifications may be made without deaprting from the spirit and scope of the present iveniton, it is not intended to have the present inveniton limited to the specific embodiment thereof, except as defined in the appended claims.

What is claimed is:

1. An apparatus for removing flash from a flash-forming region of a polymeric molded product comprising:
    (a) flash removing means, including a cutting reamer for removing the flash by being brought into contact with a flash-forming region of a polymeric molded product and a motor for rotating the cutting reamer;
    (b) moving means for allowing the reamer to be in contact with the polymeric molded product within a predetermined range of pressing force toward the polymeric molded product;
    (c) a supporting member for supporting the motor so that the motor is fixed against axial movement but movable in at least one direction perpendicular to its axial direction; and
    (d) return members operable when the motor is moved, for allowing a position of the motor in relation to the supporting member after being displaced to return to a previous position before the displacement of the motor, the return members being at least three in number and being arranged around the motor;
    said supporting member (33) including: a base plate (34) disposed around the motor (32) with a certain clearance therebetween; at least three bearings (36) fixed on the base plate (34) to allow the motor (32) to be movable not in its axial direction but in directions perpendicular to its axial direction; and a supporting plate (42) arranged on the bearings (36).

2. The apparatus for removing flash from a flash-forming region of a polymeric molded product according to claim 1, wherein said cutting reamer has on its outer periphery a plurality of blades each of which has a normal clearance angle which is 0°;

plurality of blades are angularly spaced from one another about said rotation axis, each two angularly adjacent ones of said blades being separated by a respective groove of rectangular transverse cross-sectional shape formed in said cutting reamer, whereby, in use, said moving means allows said reamer to move from and return to a position relative to said supporting member through said supporting member and said return members, and moves said supporting member along a predetermined locus;

said reamer being arranged to be held in contact with said flash-forming region of said polymeric molded product within said predetermined range of pressing force toward said flash-forming region while having a flank of each of said blades substantially contact with said flash-forming region, thereby, in use, effecting a following movement along said polymeric molded product through said flanks of the blades.

3. An apparatus for removing flash from a flash-forming region of a polymeric molded product comprising:
(a) flash removing means, including a cutting reamer for removing the flash by being brought into contact with a flash-forming region of a polymeric molded product and a motor for rotating the cutting reamer;
(b) moving means for allowing the reamer to be in contact with the polymeric molded product within a predetermined range of pressing force toward the polymeric molded product;
(c) a supporting member for supporting the motor so that the motor is fixed against axial movement but movable in at least one direction perpendicular to its axial direction; and
(d) return members operable when the motor is moved, for allowing a position of the motor in relation to the supporting member after being displaced to return to a previous position before the displacement of the motor, the return members being at least three in number and being arranged around the motor;
a pair of coupling members (43) installed to an outer periphery of the motor (32) at positions above the supporting plate (42), the coupling members (43) being placed on the supporting plate (42).

4. An apparatus for removing flash from a flash-forming region of a polymeric molded product comprising:
(a) flash removing means including a cutting reamer having on its outer periphery a plurality of blades each of which has a normal clearance angle which is 0° for removing the flash by being brought into contact with a flash-removing region of a polymeric molded product, and a motor for rotating the cutting reamer;
(b) a supporting member for supporting the motor so that the motor is fixed against axial movement but movable in at least one direction perpendicular to its axial direction;
(c) return members operable when the motor is moved, for allowing a position of the motor in relation to the supporting member after being displaced to return to a previous position before the displacement of the motor, the return members being at least three in number and being arranged around the motor; and p1 (d) moving means for allowing the reamer to move from and return to a position relative to the supporting member through the supporting member and return the members, and moving the supporting member along a predetermined locus;
the reamer being arranged to be held in contact with the flash-forming region of the polymeric molded product within a predetermined range of pressing force toward the flash-forming region while having a flank of each of the blades substantially contact with the flash-forming region thereby effecting a following movement along the polymeric molded product through the flanks of the blades;
the return member (66) being cylinder means (37) including a cylinder (45) and a piston (46).

5. The apparatus for removing flash from a polymeric molded product according to claim 4, wherein the return member (66) further includes springs (57, 60).

6. The apparatus for removing flash from a polymeric molded product according to claim 4, wherein the cylinder (45) has two casings (47, 48) one of which (47) is provided with an oil storage chamber (49) for charging and discharging oil into and out of the chamber (49), so that an oil flow into and out of the cylinder (45) regulates a movement of the piston (46).

7. The apparatus for removing flash from a polymeric molded product according to claim 4, wherein the piston (46) has, at its end facing the motor (32), a bearing (51) for regulating a positional relationship between the motor (32) and the supporting member (33) by being brought into contact with the motor (32).

8. An apparatus for removing flash from a flash-forming region of a polymeric molded product comprising:
(a) flash removing means including a cutting reamer having on its outer periphery a plurality of blades each of which has a normal clearance angle which is 0° for removing the flash by being brought into contact with a flash-removing region of a polymeric molded product, and a motor for rotating the cutting reamer;
(b) a supporting member for supporting the motor so that the motor is fixed against axial movement but movable in at least one direction perpendicular to its axial direction;
(c) return members operable when the motor is moved, for allowing a position of the motor in relation to the supporting member after being displaced to return to a previous position before the displacement of the motor, the return members being at least three in number and being arranged around the motor; and
(d) moving means for allowing the reamer to move from and return to a position relative to the supporting member through the supporting member and the return members, and moving the supporting member along a predetermined locus;
the reamer being arranged to be held in contact with the flash-forming region of the polymeric molded product within a predetermined range of pressing force toward the flash-forming region while having a flank of each of the blades substantially contact with the flash-forming region thereby effecting a following movement along the polymeric molded product through the flanks of the blades;
the return members (66) being springs (57, 60).

9. The apparatus for removing flash from a polymeric molded product according to claim 8, wherein the springs (57) are fastened between the motor (32) and the supporting member (33) under tensional conditions.

10. An apparatus for removing flash from a flash-forming region of a polymeric molded product comprising:
   (a) flash removing means, including a cutting reamer for removing the flash by being brought into contact with a flash-forming region of a polymeric molded product and a motor for rotating the cutting reamer;
   (b) moving means for allowing the reamer to be in contact with the polymeric molded product within a predetermined range of pressing force toward the polymeric molded product;
   (c) a supporting member for supporting the motor so that the motor is fixed against axial movement but movable in at least one direction perpendicular to its axial direction; and
   (d) return members operable when the motor is moved, for allowing a position of the motor in relation to the supporting member after being displaced to return to a previous position before the displacement of the motor, the return members being at least three in number and being arranged around the motor;
   the return members (66) being springs (57, 60);
   the springs (57) being fastened between the motor (32) and the supporting member (33) under tensional conditions;
   coupling members (43) installed to an outer periphery of the motor (32) to allow the motor (32) and the supporting member (33) not to be movable in relation to each other in an axial direction of the motor (32); and
   a spring fastening member (38) provided to said supporting member (33), the springs (57) being fastened between the coupling members (43) and the spring fastening member (38).

11. The apparatus for removing flash from a polymeric molded product according to claim 10, further comprising: fastening portions (44) provided to the coupling members (43); and a fastening portion (54) provided to the spring fastening member (54), the springs (57) being fastened between the both fastening portions (44, 54).

12. An apparatus for removing flash from a flash-forming region of a polymeric molded product comprising:
   (a) flash removing means, including a cutting reamer for removing the flash by being brought into contact with a flash-forming region of a polymeric molded product and a motor for rotating the cutting reamer;
   (b) moving means for allowing the reamer to be in contact with the polymeric molded product within a predetermined range of pressing force toward the polymeric molded product;
   (c) a supporting member for supporting the motor so that the motor is fixed against axial movement but movable in at least one direction perpendicular to its axial direction; and
   (d) return members operable when the motor is moved, for allowing a position of the motor in relation to the supporting member after being displaced to return to a previous position before the displacement of the motor, the return members being at least three in number and being arranged around the motor;
   the return members (66) being springs (57, 60);
   the springs (60) being fastened between the motor (32) and the supporting member (33) under compressed conditions.

13. The apparatus for removing flash from a polymeric molded product according to claim 12, further comprising a spring holding member (39) provided to the supporting member (33), the spring holding member (39) being provided with three or more through holes (59) extending in directions toward the axis of the motor (32), the springs (60) being inserted in the through holes (59).

14. A method for removing flash from armoring material of a steering wheel, comprising the steps of:
   (a) securing a steering wheel with polyurethane foam armoring material flash, on a base;
   (b) rotating a cutting reamer using a motor, said cutting reamer having a plurality of blades each of which has a normal clearance angle which is substantially 0°, each two angularly adjacent ones of said blades having located therebetween a groove of rectangular transverse cross-sectional shape;
   (c) moving a supporting member along a predetermined moving locus to move a flank of each of said blades substantially in contact with said flash-forming region, said reamer being attached to said supporting member with a clearance provided therebetween so as to be movable relative to a flash-forming region of said armoring material of said steering wheel only in a direction perpendicular to an axial direction of said motor;
   (d) providing returning members between said reamer and said supporting member for allowing a position of said reamer in relation to said supporting member after being displaced to return substantially to a previous position;
   said moving step (c) including a floating step for moving said reamer in to said relation supporting member due to undulation of said flash-forming region of said armoring material of said steering wheel and returning said reamer to said previous position, said moving locus being predetermined so that said cutting reamer is in contact with said flash-forming region of said armoring material of said steering wheel with a slight pressing force toward said armoring material of said steering wheel.

* * * * *